(12) United States Patent
Dhawan et al.

(10) Patent No.: US 11,605,851 B1
(45) Date of Patent: Mar. 14, 2023

(54) SYSTEMS, METHODS AND APPARATUS FOR IMPROVING RECHARGEABLE ENERGY STORAGE DEVICES AND INTEGRATED CIRCUITS

(71) Applicant: KNOETIK SOLUTIONS, INC., North Potomac, MD (US)

(72) Inventors: Kyra Dhawan, North Potomac, MD (US); Kian Dhawan, North Potomac, MD (US)

(73) Assignee: KNOETIK SOLUTIONS, INC., North Potomac, MD (US)

( * ) Notice: Subject to any disclaimer, the term of this patent is extended or adjusted under 35 U.S.C. 154(b) by 0 days.

(21) Appl. No.: 17/480,383

(22) Filed: Sep. 21, 2021

(51) Int. Cl.
| | |
|---|---|
| *H01M 10/653* | (2014.01) |
| *H01M 10/48* | (2006.01) |
| *H01M 10/613* | (2014.01) |
| *H01M 10/625* | (2014.01) |
| *H01M 50/434* | (2021.01) |
| *H01M 4/583* | (2010.01) |
| *H01M 4/133* | (2010.01) |
| *H01M 50/121* | (2021.01) |
| *H01M 10/0525* | (2010.01) |

(52) U.S. Cl.
CPC ......... *H01M 10/653* (2015.04); *H01M 4/133* (2013.01); *H01M 4/583* (2013.01); *H01M 10/0525* (2013.01); *H01M 10/48* (2013.01); *H01M 10/613* (2015.04); *H01M 10/625* (2015.04); *H01M 50/121* (2021.01); *H01M 50/434* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 8,378,623 B2 | 2/2013 | Kusch et al. | |
| 9,203,084 B2 | 12/2015 | Wang et al. | |
| 9,305,716 B2 | 4/2016 | Tan et al. | |
| 2012/0082877 A1* | 4/2012 | Song | H01M 4/505 429/94 |
| 2015/0147642 A1* | 5/2015 | Ling | H01M 10/054 429/188 |
| 2015/0311569 A1* | 10/2015 | Yu | H01M 4/364 429/300 |
| 2016/0218387 A1* | 7/2016 | Tajima | H01M 10/0431 |
| 2016/0336627 A1* | 11/2016 | Syed | H01M 10/6551 |
| 2018/0086224 A1 | 3/2018 | King | |
| 2020/0099019 A1* | 3/2020 | Li | H01M 50/10 |
| 2021/0021003 A1* | 1/2021 | Chen | H01M 10/443 |
| 2021/0053689 A1* | 2/2021 | Lynn | B60L 1/08 |
| 2021/0328228 A1* | 10/2021 | El-Zahab | H01M 4/628 |
| 2021/0328290 A1* | 10/2021 | Lee | H01M 50/531 |

FOREIGN PATENT DOCUMENTS

WO WO-2017215305 A1 * 12/2017 .......... H01M 10/052

OTHER PUBLICATIONS

Kim, Haegyeom, et al. "All-Graphene-Battery: Bridging the Gap between Supercapacitors and Lithium Ion Batteries." Scientific Reports, vol. 4, No. 1, 2014, https://doi.org/10.1038/srep05278. (Year: 2014).*
Song, J. et al., "Preparation and Characterization of Graphene Oxide," Journal of Nanomaterials, vol. 2014, Article ID 276143, Hindawi Publishing Corporation, Mar. 11, 2014, 6 pages.
Zhou, X., et al., "Graphene modified LiFePO4 cathode materials for high power lithium ion batteries," Journal of Materials Chemistry, The Royal Society of Chemistry, Jan. 24, 2011, pp. 3353-3358.
Kammoun, M., et al., "Flexible thin-film battery based on graphene-oxide embedded in solid polymer electrolyte," Nanoscale, Issue No. The Royal Society of Chemistry, Sep. 30, 2015, 7 pages.

* cited by examiner

*Primary Examiner* — Robert S Carrico
(74) *Attorney, Agent, or Firm* — Dave Law Group LLC; Raj S. Dave

(57) ABSTRACT

Rechargeable energy storage battery system comprises a cell, which comprises a) an electrolyte comprising a material comprising carbon, wherein the electrolyte is in a solid state; b) an anode electrode comprising a first material comprising graphene; c) a cathode electrode comprising a second material comprising graphene; d) a separator between the anode electrode and the cathode electrode. Anode comprising graphene, cathode comprising graphene oxide, the electrolyte comprises graphene oxide, organic, polymer, inorganic material.

19 Claims, 9 Drawing Sheets

| ATTRIBUTES | SINGLE LAYER GRAPHENE | GRAPHENE OXIDE | REDUCED GRAPHENE OXIDE |
|---|---|---|---|
| Synthesis | Chemical Vapor Disposition (CVD) Thermal Decomposition of SiC Graphene Exfoliation | Oxidation of Graphite Exfoliation of Graphite | Reduced Graphene Oxide |
| C:O Ratio | No Oxygen | 2-4 | 8-246 |
| Young's Modulus (TPa) | 1 | 0.2 | 0.25 |
| Electron Mobility $(cm^2\ V^{-1}\ S^{-1})$ | 10,000 – 50,000 | insulator | 0.05 – 200 |

SYSTEMS, METHODS AND APPARATUS FOR IMPROVING RECHARGEABLE ENERGY STORAGE DEVICES AND INTEGRATED CIRCUITS

FIELD OF THE INVENTION

An embodiment relates to systems, apparatus or methods for smart rechargeable energy storage device such as a rechargeable electric vehicle battery and integrated chips that uses an alternative composition of a form of organic pure carbon in the solid-state to be able to quickly charge, hold capacity, discharge slowly, eliminate safety hazards, and provide long range.

BACKGROUND

The lead acid battery introduced in 1859, is the earliest type of known rechargeable battery. Most of the world's lead acid batteries happen to be starting, lighting, and ignition (SLI) batteries. Lead acid batteries are mainly used in older automobiles for starting and emergency lighting purposes. Valve-regulated lead acid batteries (VRLA) are housed in sealed battery cases that are designed to restrict the spill of their toxic electrolytes. They are mainly used for back-up power supplies in smaller computer devices and systems. As the electrolyte diminishes, VRLA cells dry-out and lose capacity. On the other hand, deep-cycle cells are much less susceptible to degradation due to multiple charge cycling and are required for applications where the batteries are regularly discharged, such as in electric vehicles. These batteries have thicker plates that can deliver less peak current and can withstand frequent discharging and regular controlled overcharging. The eventual failure of deep-cycle cell occurs due to corrosion of the positive plate grids rather than sulfation.

Excessive charging causes electrolysis, emitting hydrogen ($H_2O$) and oxygen ($O_2$) and sometimes can ignite to cause an internal explosion. The explosion can cause the battery's casing to burst, spray casing fragments and harmful toxic including causing a fire hazard. Individual cells within a battery can also short circuit, causing an explosion. The cells of sealed VRLA batteries typically swell when the internal pressure rises and can pose a risk of an internal explosion causing harm and damage to their surroundings.

A rechargeable energy storage device's capacity is a measure of how much energy can be stored and eventually discharged by the device. Rechargeable energy storage device are important systems for energy storage, with applications in electronics, electric vehicles, telephone communication systems, power supplies, and many other applications.

A li-ion battery is a type of the modern-day rechargeable battery. As the name implies, lead-acid batteries are made with lead, while li-ion batteries are made with metal lithium. The li-ion battery has higher energy density than a lead acid battery. A vital evaluation criterion for battery cells is its energy density. The key is to differentiate between the gravimetric unit watt-hours per kilogram (Wh/kg) and the volumetric unit watt-hours per litre (Wh/l). A typical li-ion cell today is 220 Wh/kg and close to 600 Wh/l. Volumetric energy density, on the other hand, is also key as the need towards more and more capacity eventually enlarges overall size and hence the space required for installation of the energy storage device. But it is difficult to increase the energy density beyond that of today's cells, which are approximately 220 watt hours per kilogram (Wh/kg) using graphite anodes (Ref: Battery500: Progress Update|Department of Energy).

Lead acid batteries have a very low energy-to-weight ratio and a low energy-to-volume ratio, and the inherent ability to supply high surge currents means that their cells have a relatively large power-to-weight ratio. These features, along with their low cost, are what make them attractive for use in older automobiles to provide the high current required by the cranking starter motor device. In a lead-acid battery, the plates are submerged into sulfuric acid solution, the electrolytes, to react and form lead sulfate. It reaches sulfate when the battery charge is at its full level, so when it recharges, the lead sulfate dissolves back into the sulfuric acid solution and the lead plates reform their positive and negative status once again.

Li-ion batteries come in several forms with varying amounts of manganese, nickel, iron, and cobalt combined with lithium. The name li-ion is a clear depiction of the chemical process involved where lithium ions move between the electrodes during charging and discharging processes. A supporting electronic circuitry, or a smaller electronic device including an external battery management system for the battery maintenance is necessary along with a li-ion battery to keep the internal cells protected from completely discharging or overcharging in extreme temperatures and current surges. The newer potassium metal battery designs have shown to solve the dendrite problem to some extent. Also, replacing the lithium cobalt oxide positive electrode material in li-ion batteries with a lithium metal phosphate such as lithium iron phosphate (LFP) have shown to possibly improve cycle counts, shelf life, and safety, but then lowers the energy capacity.

The traditional battery types are constructed from a positive and negative electrode separated by a liquid chemical electrolyte, such as ethylene carbonate or diethyl carbonate. The lead acid batteries particularly are not designed for deep discharge. They have many thin plates designed for maximum surface area, and therefore maximum current output, which are easily damaged by deep discharge. Billions of li-ion cells with liquid electrolytes are being built and used in our day-to-day life. However, challenges yet exist on how these lithium metal anodes could be mass produced to address the noticeable safety hazards while yet offer increased energy capacity and longer range.

Existing rechargeable energy storage devices such as rechargeable electric vehicle batteries have two major drawbacks: limited range and very slow charging abilities. Along with that, they also face the challenge of a hazardous internal dendrite build up that can be very harmful for the environment and unsafe for efficient batteries.

Another main stumbling block of existing Lithium (Li) metal anodes is the nucleation and growth of dendritic formation during the electrochemical plating-stripping process that occurs when the battery is being charged or discharged. These dendrite formations can be problematic in many respects, as they increase irreversible capacity loss, reduce the coulombic efficiency (CE), and promote the degradation or drying of the electrolyte.

Another pressing issue is that the spikey dendritic formations can pierce through the battery separator and electrically short the battery resulting in a severe thermal runaway situation, and eventually a fire. Various innovative approaches to control and suppress the growth of Li dendrites can be adopted, but a 100% suppression seems to be challenging. This is because kinetically, the nucleation and growth of Li dendrites also seems to be favorable during electrochemical plating and stripping reactions. Therefore, it is seen that when the plating-stripping current density is raised above ~9 mA cm$^{-2}$, there occurs a substantial self-heating of the dendrites. However, when the current density was increased all the way up to ~15 mA cm$^{-2}$, the dendrites tend to smoothen out and merge together, substantially lowering the risk of dendrite penetration through the separator. The self-heating mechanism is to be promoted at safe levels, below any danger of electrolyte breakdown or thermal damage to the separator. These are persisting challenges and some solutions that need to be improved with a more efficient structure and composition of a rechargeable energy device.

Electric vehicles (EVs) are of great interest for transportation applications and can provide benefits of low or zero emissions, quiet operation, and reduced dependence upon fossil fuels. However, conventional electric vehicles that rely primarily or exclusively on battery power for power train and propulsion may suffer degradation in vehicle range when the vehicle is operated near extremes of ambient environmental temperatures, particularly at colder temperatures. Hence, thermal management in electric vehicles are important.

A noticeable drawback of li-ion cells is that they cannot be charged normally and safely below sub-zero temperatures, which causes complications such as internal short-circuits. Also, li-ion cells are susceptible to experiencing high stress by voltages that ranges outside of the allowable safe ranges that are to remain between 2.5 and 3.65/4.1/4.2 or 4.35V and depending on the composition of the li-ion cells. Exceeding this voltage range results in premature aging and safety risks due to the reactive components in the li-ion cells. With li-ion, there have been major incidents including overheating, overcharging, and puncturing that cause runaway chemical imbalances in li-ion batteries, resulting in fire and other damages. If a li-ion battery is damaged, crushed, or is subjected to a higher electrical load without an overcharge protection, then the risk of a safety hazard greatly increases. Short circuits can trigger battery explosion, resulting in fire and other damage. Carriage and shipment of some kinds of li-ion batteries may be restricted or prohibited aboard major airlines because of the ability of most types of li-ion batteries to fully discharge very rapidly when short-circuited, leading to overheating and possible explosion in a process called thermal runaway. Several major U.S. airlines banned smart luggage with non-removable batteries from being checked into travel in the cargo hold due to the fire risk.

In the discharged state both the positive and negative plates become sulfuric acid lead salt (PbSO4), and the electrolyte loses much of its dissolved sulfuric acid to become primarily water. The discharge process is driven by the pronounced reduction in energy when 2 H+(aq) (hydrated protons) of the acid react with O2 ions of PbO2 to form the strong O—H bonds in H2O (ca. −880 kJ per 18 g of water). This highly exergonic process also compensates for the energetically unfavorable formation of Pb2+(aq) ions or lead sulfate (PbSO4(s))

In the charged state, the chemical energy of the lead acid battery is stored in the potential difference between the pure lead at the negative side and the PbO2 on the positive side, plus the aqueous sulfuric acid. The electrical energy produced by a discharging lead acid battery can be attributed to the energy released when the strong chemical bonds of water or H2O molecules are formed from H+ ions of the acid and O2 ions of PbO2. And conversely, during the charging state, the lead acid battery acts as a water-splitting device. In the fully charged state, the negative plate consists of lead and the positive plate is lead dioxide. The electrolyte solution has a higher concentration of aqueous sulfuric acid which stores most of the chemical energy.

Lead acid batteries lose the ability to accept a charge after a deep discharge due to sulfation, the crystallization of lead sulfate. Since they generate electricity through a double sulfate chemical reaction and as batteries cycle through numerous discharges and charges, some lead sulfate does not recombine into electrolyte and slowly converts into a stable crystalline form that no longer dissolves on recharging. Eventually, not all the lead is returned to the batteries' cell plates and the amount of usable active material necessary for electricity generation declines over time. Sulfation occurs in lead acid batteries when they are subjected to irregular charging. This impedes recharging and sulfate deposits ultimately expand, cracking the plates and destroying the battery cells. Eventually, so much of the battery plate area is damaged and unable to supply current that the battery cell capacity is greatly reduced. Further corrosion of the external metal parts of the lead acid battery results from a chemical reaction of the battery terminals, lugs, and connectors. An average li-ion battery can cycle between 2,000 and 5,000 times, whereas an average lead-acid battery can last roughly 500 to 1,000 cycles.

The lead compounds in these lead acid batteries are extremely toxic. Long-term exposure to even tiny amounts of these compounds can cause serious organ damages in living beings. The auto industry uses over 1,000,000 plus metric tons of lead every year, with 90% going to conventional lead acid vehicle batteries. While lead recycling is a well-established industry, more than 50,000 metric tons ends up in landfills every year. According to the federal Toxic Release Inventory, another 70,000 metric tons gets released in the lead mining and manufacturing process.

Battery chargers are also important components in the development of electric vehicles. Historically, two types of chargers for EV application are known. One is a standalone type where functionality and style can be compared to a gas station to perform rapid charging. The other is an on-board type, which would be used for slower C-rate charging from a conventional household outlet. The national grid delivers AC (Alternating Current), but electric cars need DC (Direct Current) to charge their battery pack. Type 1 and Type 2 connectors are the most commonly used AC sockets. For fast charging, DC the CHAdeMO and SAE Combo (also known as Type 2 CCS, which stands for "Combined Charging System") are the most commonly used DC connectors. EVs typically include energy storage devices such as low voltage batteries (for range and cruising, for example), high voltage batteries (for boost and acceleration, for example), and ultracapacitors (for enhanced boost and acceleration, for example), to name a few. Because these energy storage devices operate under different voltages and are charged differently from one another, typically each storage device includes its own unique charging system. This can lead to multiple components and charging systems because the storage devices typically cannot be charged using charging systems for other storage devices. In other words, a charging device used to charge a low-voltage battery typically cannot be used to charge an ultracapacitor or a high-voltage battery. Therefore, the creation and use of intelligent, smart devices in EV's are crucial.

Electric Vehicle Supply Equipment or a battery charger delivers electrical energy from an electricity source to charge an EV's battery. The EVSE communicates with the EV to ensure that an appropriate and safe flow of electricity is supplied. EVSE units are commonly referred to as charging stations.

There are a lot of concerns about the environmental consequences of improper disposal and of lead smelting operations, among other reasons. Extensive efforts to reduce the weight of current electrodes by making them thinner or more porous, have had unexpected repercussions, such as making the existing batteries (li-ion and led acid) more fragile, chemically unstable, or requiring more of the inflammable electrolyte solutions.

Carbon (C) is a chemical element with atomic number 6 and is found to be abundantly available in nature. Carbon is found to be in the solid state at room temperature and is found to be in varying allotrope forms. Among them, the softer and the harder materials known in nature include graphite and diamond, respectively. The other carbon allotropes discovered include fullerenes, carbon nanotubes, carbon nanofibers, and carbon nanospheres. The last and most significant carbon allotrope added is 'graphene'.

Graphene consists of a two-dimensional (2D) carbon atom network with sp2 hybridization and only one atom thick. In one aspect, each atom is bonded by a covalent bond to other three carbon atoms. These carbon atoms are densely packaged in a honeycomb-shape crystal lattice comprising, in turn, of two superimposed triangular subnets. Graphene has been known to mankind only recently, since 1960. In 2013, Stanford University physicists reported that single-layer graphene is a hundred times more chemically reactive than thicker multilayer sheets.

The object of present invention is to provide a next-generation smart, miniaturized, highly efficient, light weight energy storage device using pure carbon-based biodegradable materials that include the various forms of graphene as the active material. It is slated to revolutionize the future of energy storage making everything stronger, lighter, flexible, safer, and ecologically sustainable.

SUMMARY

Present invention relates to use of organic carbon-based graphene and the various forms of graphene as the active material in electric batteries. Graphene has some key properties such as: High conductivity—Conductive materials, Electrical Vehicle Batteries, and Supercapacitors, Large specific surface area and Conductance—Sensors and Biosensors, High theoretical surface area and Electron transfer along 2d surface—Clean Energy Devices Transparency (>99%) and High electronic conductivity—Electronic and Mobile displays and Touch screens, High mechanical stress (hardness)—Manufacturing and construction, Linear band structure, High electrical conductivity, High-speed electron mobility, High optical transmittance, Easy absorption of gases, Anomalous quantum hall effect, Irrelevant spin-orbit coupling. Single layered graphene sheets are seen to be a versatile, multifunctional, 2-D atomic carbon nanomaterial that clearly has a unique combination of thermal and electrical conductivity along with impressive mechanical properties. Remarkable fracture toughness, self-healing abilities, and high elasticity enables the single layered graphene sheets to also be used as the active material of the EV battery cell packs either as an individual material or as a reinforcing agent in the organic polymer nanocomposites.

Present invention relates to improving the overall performance and effectiveness of electric vehicle (EV) batteries. The key to such improvement would be to greatly enhance their gravimetric energy density—measured in watt hours per kilogram—using safer, easily recyclable, organic materials that are abundantly available in nature. Pure organic carbon-based Graphene in anodes and cathodes would be considered the 'holy grail' for greatly enhancing energy density in EV batteries, and thereby greatly extending the range output compared to incumbent options like graphite at 300 Wh/kg in the race to reach more competitive energy density at 1000 Wh/kg or more. Thus, offering a range of 650 miles, 750 miles, 800 miles, 1000 miles, 5000 miles, 7500 miles, 10,000 miles, 20,000 miles, 30,000 miles, 60,000 miles or higher on a single charge depending on the size of the EV battery and the consequent number of cells pack housed in the EV battery casing.

The attempt is to move away from highly inflammable and explosive materials and develop a low-cost, carbon-based earth-abundant, organic-based cathode materials that are abundantly available for a solid-state EV battery. Conventionally the cathode material determines the capacity and voltage of an EV battery and are subsequently the most expensive part of EV batteries due to the usage and dependency on scarce and expensive materials found in mines. The attempt is also to improve the electrode-level energy density in EV batteries by optimizing the cathode nanostructure for improved ion transport within the battery cells. To achieve this the fundamental nanostructure of the battery cells are to be replaced using a safe, easily recyclable, easily available, organic pure carbon-based earth-abundant material—graphene. Electrolytes are usually liquid, but with advancements in cell research and technology that should not be necessary, as it is seen that electrolytes can also be solid. This, combined with pure carbon-based graphene anodes, can prevent short-circuiting, improve energy density, greatly reduce the overall weight, and enable faster charging.

The invention solves the issues with all conventional batteries including lead and li-ion batteries. Graphene as a unique material can be consolidated into both the anode and cathode in different battery frameworks to greatly enhance and revolutionize the effectiveness, safety, and overall life of the EV battery. Enhancing the charge and discharge cycle rate in many folds and greatly extending the energy density and the power density of the EV batteries results in exponential increase in the cumulative range of the electric vehicle.

An embodiment relates smart rechargeable energy storage device such as a smart rechargeable electric vehicle battery that uses an alternative composition of a form of organic pure carbon in the solid-state to be able to quickly charge, hold capacity, discharge slowly, self-heal, self-charge, eliminate safety hazards, and provide long range. The secret of the new smart energy device is the strategic combination of different complimenting hybrid materials, therefore, also referred to as 'asymmetrical.'

In one embodiment, the rechargeable energy storage battery system comprises of a cell, wherein the cell comprises: a) an electrolyte comprising a material made of pure organic carbon, wherein the electrolyte is in a solid state; b) an anode electrode comprising a first material made of graphene; c) a cathode electrode comprising a second material made of graphene; d) a separator material also made of a form of graphene, between the anode electrode and the cathode electrode, wherein said system is configured to deliver an electrical power at a rate of about 900 Wh/kg, 1800 Wh/kg, 3600 Wh/kg, 5000 Wh/kg, 7000 Wh/kg, 10000 Wh/kg, 20000 Wh/kg, 50000 Wh/kg or more. The present invention focuses on the pure carbon-based cells and extremely stable and safe electrolytes shows a path to a 900

Wh/kg, 1800 Wh/kg, 3600 Wh/kg, 5000 Wh/kg, 7000 Wh/kg, 10000 Wh/kg, 20000 Wh/kg, 50000 Wh/kg, and beyond.

TABLE 1

Summary of various types battery known in art.

| TYPE | Wh/kg | Joules/kg | Wh/liter |
|---|---|---|---|
| Lead-acid | 41 | 146,000 | 100 |
| NiMH | 95 | 340,000 | 300 |
| Li-ion | 128 | 460,000 | 230 |

In an embodiment, single layered graphene sheets form the two electrodes, include the cathode and anode are sandwiched between a flexible organic polymeric film.

In one embodiment, the anode electrode is in form of a first plate and a first grid, wherein the first plate is comprised of graphene oxide and first grid is comprised of a graphene alloy; wherein the first grid is configured to work as an electron conductor between the anode electrode and the first plate of the cathode electrode.

An embodiment, the cathode electrode is in form of a second plate and a second grid, wherein the second plate is comprised of graphene and second grid is comprised of a graphene alloy, wherein the second grid is configured to work as an electron conductor between the anode electrode and the cathode electrode.

In an embodiment, the electrolyte comprises graphene oxide, organic polymer, inorganic material.

In an embodiment, the cell comprises of a catalyst made of graphene to start a reaction between the anode electrode and the cathode electrode.

The key reason for the slow pace of EV battery innovation is chemistry. In conventional li-ion batteries the anode is made of graphite or silicon, and both materials have reached their energy density limit. A new anode material is required to improve battery performance, and that material is graphene. Advantages of 100% pure carbon-based single-layered graphene nanowire batteries are highest content active pure carbon-based graphene material—100% pristine graphene. Graphene is the revolutionary material for energy density, using 100% graphene means that we can provide rechargeable EV batteries with the highest energy density with the longest charge cycle times.

High conductivity and connectivity: Single layered Graphene nanowires can be connected directly to the substrate with no binders, with nothing to block the flow of current. The single-layer pure carbon-based graphene nanowire technology would enable the highest ratio of energy to power.

The anode and cathode are to consist of a highly conductive catalyst support material (a very ft porous form of pure carbon-based material made of fine graphene) that is mixed or impregnated with a carbon alloy catalyst and applied to opposite sides of the membrane. The pure carbon-based cells contain carbon-based separators that create a barrier between the anode and cathode while allowing for the exchanging of electrons from the anode to the cathode, since electrons have a negative charge and attract to positive charges to allow for the free movement of ions.

In an embodiment, single layered graphene sheets form the two electrodes, include the cathode and anode are sandwiched between a flexible organic polymeric film.

Multiple positive electrodes and negative electrodes are combined to create a single pure carbon-based graphene cell pack or cell block that form the single battery cell pack of the apparatus. The carbon-based catalyst between the anode and cathode to get them to react would be a graphene alloy itself, a graphene substrate interaction can help orient a reaction. It is a safe substitute for an electrolyte that will allow for the movement of ions which act as an insulator. Graphene has a lot of advantages compared with other relative materials such as CNT (carbon nanotubes) including high electron mobility at room temperature, excellent thermal conductivity, and superior mechanical properties with a high Young modulus. Single-wall carbon nanotubes, often referred to as single-wall carbon nanotubes (SWCNTs) with diameters in the range of a nanometer, are one of the allotropes of carbon, intermediate between fullerene cages and flat graphene. Besides, the band gap of graphene can be tuned to produce semiconductive graphene which can used as a catalyst. Graphene has a large surface area, high carrier mobility, high thermal conductivity, high current, and heat conduction.

Many methods have been reported for the synthesis of graphene and graphene-based materials, such as the mechanical cleavage of graphite, chemical exfoliation of graphite, solvothermal synthesis, and chemical vapor deposition. Pristine graphene has a low performance toward electrochemical $CO_2$ reduction (CO2R) because of the neutral carbon atom.

Doping graphene with heteroatoms such as boron, nitrogen, and phosphorous can alter its electronic property and chemical reactivity, as well as give rise to new functions that can enhance the catalytic performance. This environment-friendly organic pure carbon-based dry cell can be rechargeable and decomposable once it has been sufficiently used or is deemed to be close to the end of its life. (Electrochemical $CO_2$ reduction into hydrocarbons and alcohols has the potential to enable a transition to a sustainable energy economy. Given that electrochemical processes operate under mild temperatures and pressures, electrochemical $CO_2$ reduction is an ideal method for storing the energy from intermittent renewable sources.)

In an embodiment, the cell comprises of a separator sheet comprising a graphene ceramic composite material, wherein the sheet is configured to filter electrons passing from the cathode electrode to the anode electrode of the cell.

In an embodiment, a sensor comprising a heat sensor configured to maintain an internal heating of the cell and to regulate the switching on-off to charge the cell autonomously and to equilibrize the cells in the cell pack.

In an embodiment, heat sensor along with smart thermal management system (STMS) help in maintaining internal heating of the cell.

In an embodiment, the microprocessor comprises of an integrated circuit comprising graphene.

In an embodiment, the nano sensor comprises graphene.

In an embodiment, graphene could be pure without any additives present in the graphene or infused with additives such as ceramic or functionalized. The functionalized graphene could work as a lubricant.

In an embodiment, a rechargeable energy storage device comprises of: a) an energy storage battery system comprising of a cell comprising of an electrolyte comprising a material comprising carbon, wherein the electrolyte is in a solid state, an anode comprising of a first graphene material and a cathode comprising of a second graphene material; b) an intelligent sensor configured in energy storage device to uptake electrons from a frictional energy to possess a built-in energy storage device; c) a sensor and/or a sensor array; d) a microprocessor; and e) a data processing unit; wherein a data retrieved from the sensor and/or the sensor array is configured to be deployed to the microprocessor for an analysis.

In an embodiment, the cell further comprises of a separator between the anode and the cathode, that is configured to act as a physical barrier between the anode and the cathode to allow exchange of electrons from the anode to the cathode.

In an embodiment, the system is configured to deliver electrical power at a rate of about 900 Wh/kg, 1800 Wh/kg, 3600 Wh/kg, 5000 Wh/kg, 7000 Wh/kg, 10000 Wh/kg, 20000 Wh/kg, 50000 Wh/kg or more on a single charge depending on the size of the EV battery and the consequent number of cells pack housed in the EV battery casing.

In an embodiment, the pure carbon-based graphene cells would be able to retain close to 95 percent capacity even after four times or five times, or 6 times, 7 times, 10 times, 20 times, 30 times, 40 times, 50 times or more than the normal high capacity li-ion cells and be able to support 10,000 charge cycles, 15,000 charge cycles, 20,000 charge cycles or more.

In an embodiment, the graphene cells would be able to retain close to 90 percent capacity, 92 percent capacity, 97 percent capacity, 98 percent capacity, 99 percent capacity even after four times or five times, or 6 times, 7 times, 10 times, 20 times, 30 times, 40 times, 50 times or more than the normal high capacity li-ion cells.

In an embodiment, 15,000 charge cycles, 20,000 charge cycles or more.

In an embodiment, the pure carbon-based graphene cells would be able to attain a higher energy density, but also performs much better with a higher power density than most other supercapacitors. (key difference being that EV batteries with a higher energy density are able to store larger amounts of energy, while those with a higher power density are able to release higher amounts of energy and a lot quicker. Batteries have a higher energy density than capacitors, but a capacitor has a higher power density than a battery. This difference comes from batteries being able to store more energy, but capacitors are able to release higher energy and more quickly.)

In an embodiment, the sensor comprising a heat sensor configured to maintain an internal heating and regulate switching on-off to charge the cell autonomously and equilibrize the cells in the cell pack.

In an embodiment, the cell comprises a catalyst comprising graphene to start a reaction between the anode and the cathode.

In an embodiment, the cathode is in form of a first plate and a first grid, wherein the first plate is comprised of graphene oxide and the first grid is comprised of a graphene alloy; wherein the first grid is configured to work as an electron conductor between the anode and the first plate of the cathode.

In an embodiment, the anode is in form of a second plate and a second grid, wherein the second plate is comprised of comprises a sponge material comprising graphene and second grid is comprised of comprises a graphene alloy; wherein the second grid is configured to work as an electron conductor between the anode and the cathode and an external circuit for support of the first material and the second material.

In an embodiment, the cell further comprises of a single layer sheet graphene ceramic composite material; wherein the sheet is configured to filter electrons passed from the cathode to the anode of the cell.

In an embodiment, a method comprising: a) assembling a smart thermal management system (STMS) comprising a cell comprising an electrolyte comprising a material comprising carbon, wherein the electrolyte is in a solid state, an anode comprising a first graphene material and a cathode comprising a second graphene material and a sensor; and b) detecting a sensory condition using the sensor to autonomously regulate the switching on-off to charge the cell and to equilibrize the cells in the cell pack.

In an embodiment, normalizing a sensory data obtained from the sensor and converting into a signal.

DETAILED DESCRIPTION

Definitions and General Techniques

Figure 1:
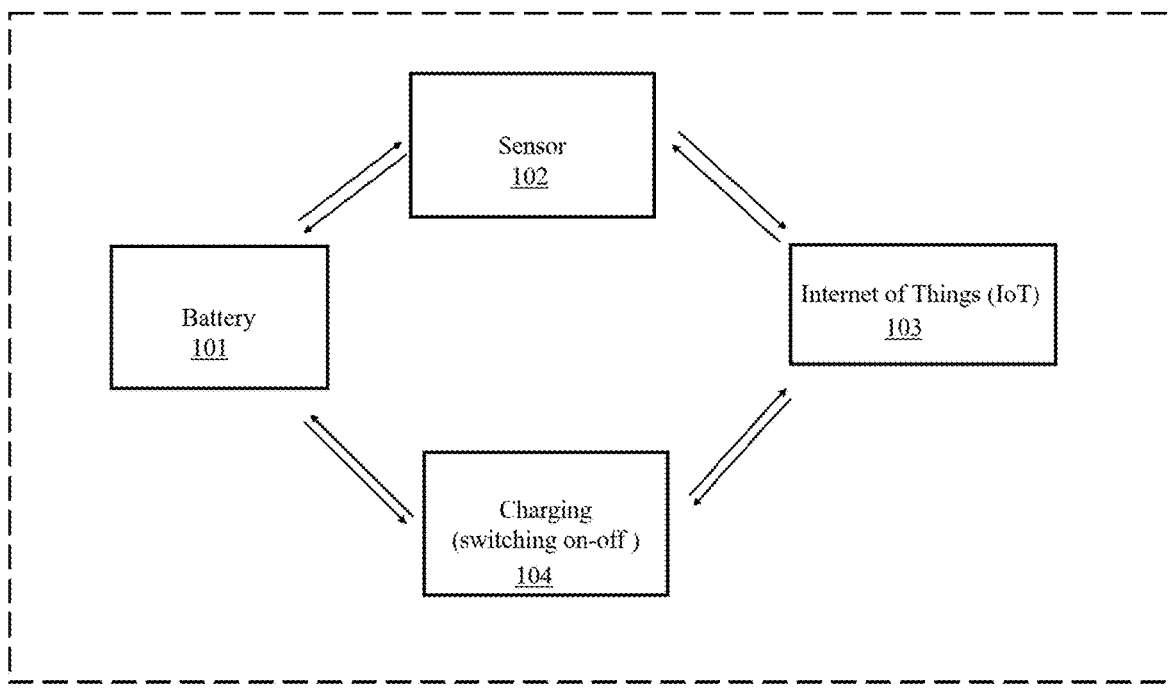
FIG. 1 is a block diagram illustrating the relationship between battery 102, sensors 104, charging (switching on-off) 108 and Internet of Things 106. The arrow mark illustrates the connection to the four systems that makes smart thermal management system for rechargeable energy devices like Electric Vehicles.
Figure 2:
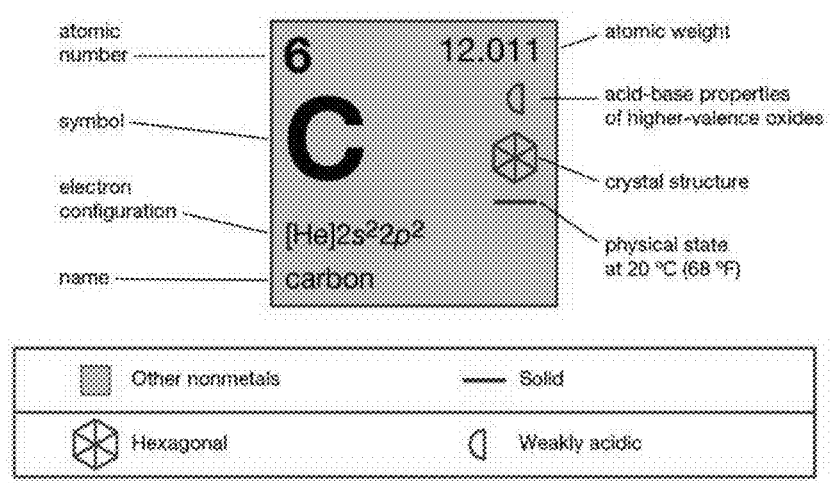
FIG. 2 shows chemical description of carbon.
Figure 3:
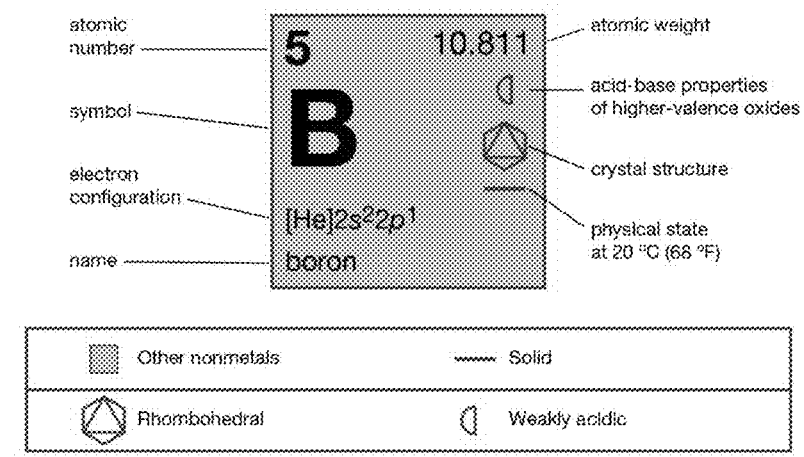
FIG. 3 shows chemical description of boron.
Figure 4:
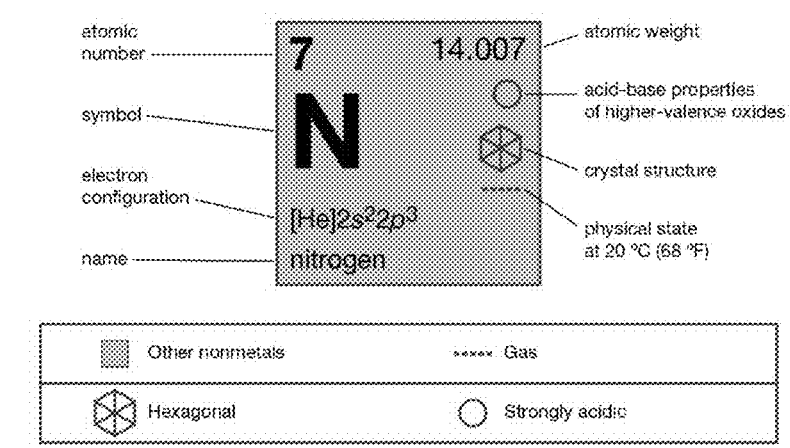
FIG. 4 shows chemical description of nitrogen.
Figure 5:
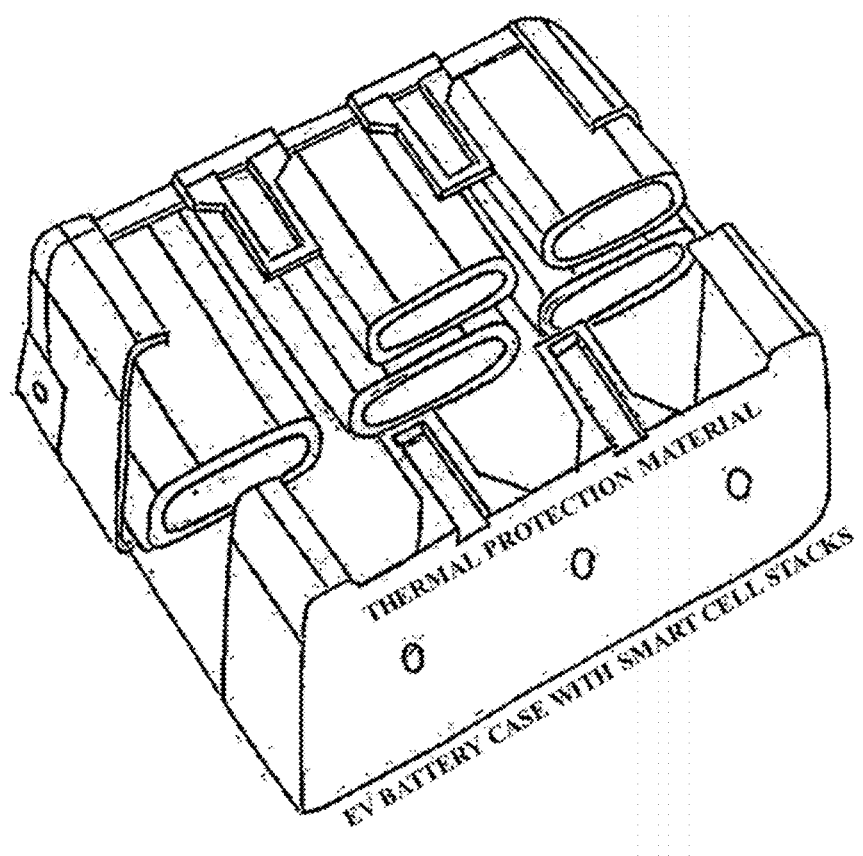
FIG. 5 shows a Removeable Graphene Cell Stack.
Figure 6:
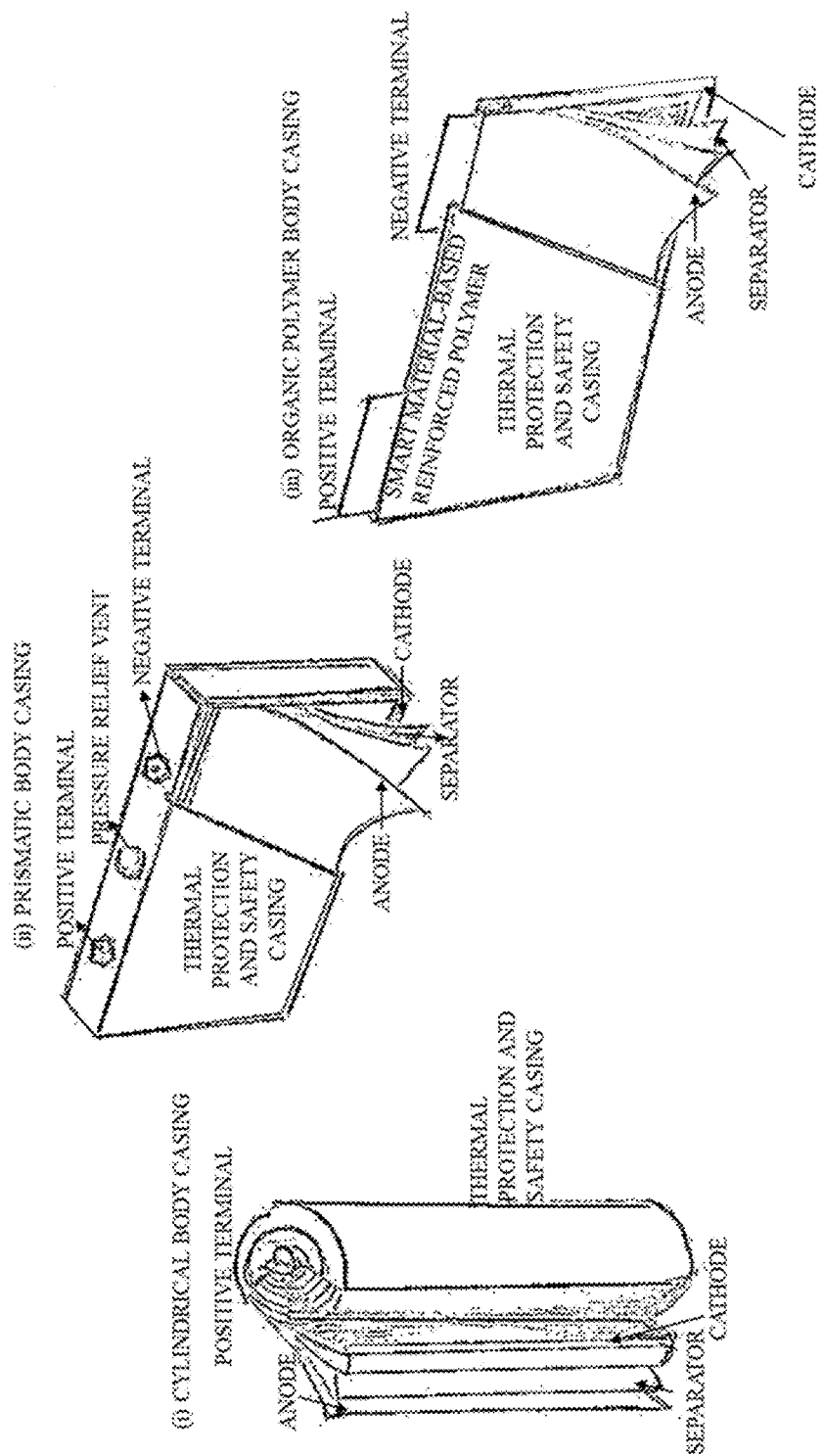
FIG. 6 shows different shapes of batteries. The cylindrical shaped batteries are currently used. This invention is to move to extremely flexible Organic Polymer casing batteries. Organic Polymer to be used as the Safety Casing of the cells. In an embodiment, Organic Polymer casing provides high strength single layered graphene sheets to be used in the flexible and viscoelastic organic polymer-based casing as a reinforcing agent in the organic polymer nanocomposites.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

No element, act, or instruction used herein should be construed as critical or essential unless explicitly described as such. Also, as used herein, the articles "a" and "an" are intended to include items and may be used interchangeably with "one or more." Furthermore, as used herein, the term "set" is intended to include items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

Unless otherwise defined herein, scientific and technical terms used in connection with the present invention shall have the meanings that are commonly understood by those of ordinary skill in the art. Further, unless otherwise required by context, singular terms shall include pluralities and plural terms shall include the singular. Generally, nomenclatures used in connection with, and techniques of, health monitoring described herein are those well-known and commonly used in the art.

The methods and techniques of the present invention are generally performed according to conventional methods well known in the art and as described in various general and more specific references that are cited and discussed throughout the present specification unless otherwise indicated. The nomenclatures used in connection with, and the procedures and techniques of embodiments herein, and other related fields described herein are those well-known and commonly used in the art.

The following terms and phrases, unless otherwise indicated, shall be understood to have the following meanings.

The term rechargeable energy storage device is a device which can be charged, discharged into a load, and recharged several times. Each rechargeable battery cell is composed of positive electrodes also known as cathodes and negative electrodes, known as anodes. The term anode designates the negative electrode where oxidation is taking place during the discharge cycle while the other electrode or the cathode is the positive electrode. During the charge cycle, the positive electrode becomes the anode, and the negative electrode becomes the cathode. For example: for most lithium-ion (li-ion) cells, the lithium-oxide electrode is the positive electrode, and a sponge-like lithium material is composed of the negative electrode.

The term battery is a device consisting of one or more cells whose chemical reactions create a flow of electrons in a circuit.

The term cell refers to a basic electrochemical unit that contains the electrodes and electrolyte. Electrodes are composed of an anode and a cathode separated by electrolyte used to produce a voltage and current. In an embodiment, cell may also contain a separator.

The term anode designates the negative electrode where oxidation is taking place during the discharge cycle while the other electrode or the cathode is the positive electrode.

The term cathode designates the positive electrode where reduction happens during discharge cycle while the other electrode or the anode is the negative electrode.

The term electrolyte is the medium that provides the ion transport mechanism between the cathode and anode of a cell.

The term solid state is materials which retain their boundaries without support. In an embodiment electrolyte in a solid state is called as solid electrolytes.

Solid electrolytes have less contact resistance but offer low conductivity. On the other hand, sulfide based inorganic ceramic solid electrolytes offer better conductivity.

Organic Separators: Optimal EV battery lifespan occurs when moderate amounts of pressure are applied to ensure electrical and thermal connections while the EV cell packs 'breathe' during their collective discharge and recharge cycles. In extremely large EV cell packs, the organic separators leveraging polymer electronics and the consequent key breathing feature can make a significant difference to the overall range. The objective is to prevent delamination and deformation in the suggested pouch-type, thermally controlled and actively cooled, pure organic carbon-based single-layer graphene battery cell packs protected by the organic polymer flexible casing, thereby keeping the EV battery cell packs safe and continually operational. Protecting the EV batteries components is supreme concern and polymer electronics including the organic separators offer significant needed protection.

The organic separators can accommodate the dimensional changes and variances of the graphene cells but deliver enough pressure to the cell package to prevent misshaping and disconnections. The organic separators is to be designed to have a very strong albeit flexible and an elastic spring-like characteristic. The more the elastic material deflects, the higher will be the potential return energy.

The organic separators have excellent high and low temperature resistance and are designed to be extremely reliable even under the extreme stress of the harsh atmospheric and internal thermal environment. They are thermally insulative, encouraging heat to be exhausted to the STMS and not transferred to neighboring battery cell packs. This is significant as excess heat is the foremost threat to EV batteries and electronics and can rather be used as regenerative energy to self-charge the cell packs. The organic separators pads reduce the severity of vibration and shock on the cell packs and its sensitive components. By sealing the gaps between cells and other components, the organic separator pads prevent the ingress of contaminants such as moisture and nano materials such as very fine debris. High performance organic separator pads are effective in temperatures between −40° F.-400° F. or more.

In an embodiment, Graphene sheets are damage tolerant and can self-heal when bombarded with carbon atoms.

Organic Polymers are appropriate for EV battery cell packs and other similar applications. Organic polymers are available as solids, fibers, gels, and films. Organic polymers are easy to process and are also cost-effective compared to metallic and ceramic biomaterials. A polymer is a substance or material consisting of very large molecules, or macromolecules, composed of many repeating subunits. Due to their broad spectrum of properties, natural organic polymers can be seen to be an essential and safe active material needed in energy storage devices such as EV Battery cell packs. Polymers range from familiar hydrocarbon polymers to natural biopolymers. Organic polymers are created via polymerization of many small molecules. Their large molecular mass, relative to small molecule compounds, produces unique physical properties including toughness, flexibility, high elasticity, and viscoelasticity.

Organic polymers are able to link directly to inorganic materials through construction of covalent bond to stabilize organic-inorganic hybrid composites. Inorganic polymers attached with polymer chains through covalent bonds enhance thermal stability and reduce aggregation of polymers. The cross-linking reagent is responsible for the polymer thermal stability, ensuring the rigidity of the bonding sites. The presence of the cross-links in the organic polymer matrix may be adjusted by varying the amount of the cross-linker. The rigidity and stability achieved by cross-linking allows the use of the organic polymer in various electronic polymers without the loss of its properties and avoiding active material degradation. Pure organic graphene reinforced hybrid organic polymer nanocomposites are prepared by incorporating inorganic species and/or cross-linking of organic active materials through covalent and/or noncovalent interactions with excellent and extraordinary electronic, mechanical, and thermal properties.

Organic polymers are seen to be significant active materials in gas sensing systems. Organic polymers have a comparatively high gas permeability. Organic conductive polymers are of great significance to organic electronics also called polymer electronics. Conducting polymers behave as semiconductors due to their heterocyclic compounds. Changes in the sensing layer's conductivity can be detected upon polar chemicals' adsorption on the surfaces. This effect is caused by the charge transfer between gas molecules and the thin layered polymer film's swelling. Such polymer nanofilms largely enhance the processes of sensing, such as stability improvement, signal noise filtering, and in the transduction element. Organic electronic systems may be built by stacking organic polymer layers on a flexible substrate.

In an embodiment, each layer can be fabricated in the form of a thin organic polymer film that is the thermal protection and the outer safety casing of each pure organic carbon-based single layered graphene sheet with atoms that are 0.142 nm apart from each other. Remarkable fracture toughness and high elasticity enables the single layered graphene sheets to also be used in the flexible casing of the EV battery cell packs either as an individual material or as a reinforcing agent in the organic polymer nanocomposites.

In an embodiment, single layered graphene sheets form the two electrodes, include the cathode and anode are sandwiched between a flexible organic polymeric film. Single layered pure organic pristine graphene sheets have the highest noticeable strength. It can be seen that an increase in tensile strength of the nanocomposite with reinforcement concentration represents enhanced mechanical properties of the nanocomposite and can effectively transfer load between the organic pristine graphene and the organic polymer. The enhanced interface between organic pristine graphene and the organic polymer can facilitate improved interfacial interaction and high-molecular-level dispersion, leading to much improved mechanical properties for safety.

In an embodiment, an organic semiconductors or semiconducting polymers are pure carbon-based compounds including small molecules, polymers, and complexes. Organic semiconductors are used as efficient support systems in organic EV battery cells due to their flexibility, low cost, and tunable properties. A wide range of organic semiconductors can be classified as electronic polymers and characterized by tunable energy gap due to the changes in chemical structure, very low carrier mobilities ($10^{-5}$-$10^{-3}$ cm2/Vs), accepting doping (reduction/oxidation) by other active materials into host matrices to alter their energy barrier. The advantages of organic electronic polymers include that they can be driven by electric fields, operated with no major constraints, and their low drive voltages (1 to 2 volts). Their extended π-conjugated organic backbones significantly allow them to behave as semiconductors and insulators, which are more flexible than inorganic conductors, and they can produce actuation through polarization.

The term cloud service is the on-demand availability of computer system resources, especially data storage and computing power, without direct active management by the user.

The term AI engine comprises several fundamental modules which include a Machine Learning Module, a Natural Language Processing Module and a Knowledge Representation (Ontology) Module which chooses from a library of algorithms to use when automatically assembling and building different learning topologies to solve different concepts making up a resulting AI model.

Nano sensors are nanoscale devices that measure physical quantities and convert these to signals that can be detected and analyzed. A nano sensor is s device that comprehends measurable actions that occur (like heat, motion, light, pressure, smell, smoke, moisture, etc), and renders an output, usually with an optical, mechanical or electrical signal.

The term IoT (Internet of Things) is a network of devices which is used to connected through the internet for transferring and sensing the data without much human intervention.

The term immersive virtual environment technology is a technology which give perception of being physically present in a non-physical world.

The term integrated circuit also referred to as an IC, a chip, or a microchip is a set of electronic circuits on one small flat piece. An integrated circuit or monolithic integrated circuit is a set of electronic circuits on one small flat piece of semiconductor material that is normally silicon based. In traditional transistors, silicon acts as a thin conducting channel, the conductivity of which can be tuned with applied voltage. The integration of large numbers of tiny MOS transistors into a small chip result in circuits that are orders of magnitude smaller, faster, and achieve high processing powers.

The term carbon is a chemical element with the symbol C and atomic number 6. Carbon is a non-metallic chemical element listed in the periodic table, very abundant, and exists in several pure forms. It forms covalent bonds, and its atoms can be arranged in various ways to create different forms such as the very flexible graphite or the very hard diamond. It is the basic building block of life; all living organisms contain carbon. Carbon helps regulate the Earth's temperature and is used for things like fuel. Carbon can link to itself to form chains called polymers or bond with up to four atoms due to its electron arrangement as there are four empty spaces in its outer shell. Carbon includes two electron shells with two electrons in the first shell and four in the outermost shell. Diamonds and graphite are among the hardest and softest natural materials known and are the most common allotropes of the carbon element. The only difference between the two is their crystal structure.

The table 2 provides chemical and physical nature of carbon and its allotropes.

TABLE 2 chemical and physical nature of carbon and its allotropes

| | |
|---|---|
| Atomic Number | 6 |
| Atomic Weight | 12.0096 to 12.0116 |

TABLE 2-continued chemical and physical nature of carbon and its allotropes

| | |
|---|---|
| Melting Point | 3,550° C. (6,420° F.) |
| Boiling Point | 4,827° C. (8,721° F.) |
| Density | |
| Diamond | 3.52 g/cm$^3$ |
| Graphite | 2.25 g/cm$^3$ |
| Amorphous | 1.9 g/cm$^3$ |
| Oxidation States | +2, +3, +4 |
| Electron Configuration | $1s^2 2s^2 2p^2$ |

The term Graphene is an allotrope of carbon consisting of a single layer of atoms arranged in a two-dimensional honeycomb lattice. Till date, it is the thinnest and one of the strongest materials known to science. Graphene is the only form of organic pure carbon existing in the solid state, in which every atom is available for chemical reaction from two sides, due to its two-dimensional (2D) structure. Atoms at the edges of a graphene sheet have special chemical reactivity. One of the most intriguing properties of graphene is that it is what is known as an anisotropic material. This means that its properties when measured on the plane surface of the carbon atom layer differ from those measured at the edges of the material. Graphene has the highest ratio of edge atoms of any allotrope, the various physical forms an element can include. The properties of graphene in small flakes, which have many edges, differ in several ways from those of the unique material produced as sheets with an area around 1 cm2. The single layered graphene sheets with higher number of edges used in the cell packs would perform better than those with lesser edges. This one factor would differentiate the individual cell's energy density. Therefore, the need to balance/equilibrize the cells and the consequent need for the self-charge feature.

Graphene is the first two-dimensional atomic crystal known to man, that shows exceptional electronic and thermal properties, high conductivity, high-speed electron mobility, robust mechanical strength, unique optical, and other physical properties.

Graphene is very thin or simply seen it is just one atom thin. Which means it's nearly transparent, letting through 97.7% of visible light. And yet it's practically impermeable. The carbon atoms in graphene are only 0.142 nm apart, so not even the smallest gas atoms (i.e., helium) can pass through.

In an embodiment, Graphene can self-repair holes in its sheets, when exposed to molecules containing carbon, such as hydrocarbons. Bombarded with pure carbon atoms, the atoms perfectly align into hexagons, completely filling the holes.

In an embodiment, graphene has the highest ratio of edge atoms of any allotrope. Defects surrounding the edge of the sheet increase its chemical reactivity.

In an embodiment, graphene being a semiconductor, its intrinsic electrical properties can be permanently modified by introducing impurities to increase reliability and quality performance.

In an embodiment, a single-layer graphene is a hundred times more chemically reactive than thicker multilayer sheets.

In an embodiment, a small bit of graphene (1*1 mm) charged for 2 seconds could lit a LED bulb for 2 MIN. In an embodiment, a small bit of graphene (1*1 mm) charged for 2 seconds could lit a LED bulb for 3 mins or 4 mins or 5 mins or more. This means that a two second charge for a piece of graphene without any water called impurities or without any allies or without any modifications, it just a pure piece of graphene, pure organic lit a LED for more between two to five minutes.

To synthesize graphene the following two methods are widely followed—The Bottom Up and Top Down methods. The Bottom-Up method uses a carbonaceous gas source to produce graphene. While the Top-Down method involves deconstructing graphite layers to form graphene sheets. Among the different Bottom-Up synthesis methods the Chemical Vapor Deposition (CVD), is considered the most extensively used to synthesize large amounts of high-quality graphene sheets. The method is simple and easily scalable and is key in producing large size and high-quality graphene layers and has the ability to synthesize graphene at wafer scale. It is considered to be highly cost effective leading to a high yield when compared with the other growth methods. By controlling the CVD parameters, such as type of metal substrate and precursors, catalysts, temperature, the growth of graphene layer can be tuned. Depending on the quality of the graphene, and the number of graphene layers to be obtained the formation of different types of graphene include graphene monolayer, graphene bilayer, graphene few-layer, and graphene multilayer on the metal substrate used.

In an embodiment, Graphene is an excellent conductor of heat and electricity like metals, it, among many of its various forms, are also elastically stiff, strong, brittle, and heat tolerant. It is highly resistant to chemical attack, readily moldable, and damage tolerant as they can be highly oxidation resistant. It has very unique properties including that it is 200 times stronger than steel as well as very flexible. It is fire resistant and retains heat. Graphene is an excellent conductor of electricity and heat. It has such a high density that not even helium can pass through it. It is a transparent metal that is not affected by ionizing radiation either.

While pure carbon-based material such as graphene and carbon nanotubes are organic, on the other hand, allotropes of carbon, including graphite and diamond, are inorganic. Single-wall carbon nanotubes are one of the allotropes of carbon, intermediate between fullerene cages and flat graphene.

The Table 3 below shows difference in graphene, graphite and carbon.

TABLE 3

Differences in graphene, graphite and Carbon.

| Characteristic | Carbon | Graphene | Graphite |
|---|---|---|---|
| Forms | Two naturally occurred forms are diamond and graphite with a crystalline structure. Two most common allotropes (exist in more than one crystalline form) of carbon are diamond and graphite. Carbon atoms are covalently bonded. The amorphous varieties of carbon are based upon microcrystalline forms of graphite. The single layers of carbon in graphite are called graphene. | Perfectly flat graphene is inert. It needs structural/chemical irregularities for chemical applications such as Dirac points or doping. Many different applications of graphene require precise doping with charge carriers. Since it is two-dimensional, it is very sensitive so its electronic properties can be easily modified by deposition (gas to solid without going through liquid) different atoms and molecules. Graphene, although may work at any doping, including zero doping. Many different chemical modifications of graphene. Graphene can be a bridge in materials science and fundamental physics such as quantum mechanics. | Consists of rings of six carbon atoms (hexagonal). Graphite is dark gray to black and very soft (with a hardness of 1½ on the Mohs scale) |
| Strength | | More than 40 times stronger than diamond, 200 times stronger than steel. Strongest material ever recorded, 130 gigapascals compared to .3757 gigapascals of Kevlar. | Naturally a very brittle compound due to its sheer planes. Pyrolytic graphite is produced by heating a hydrocarbon nearly to decomposition until the graphite can crystallize (pyrolysis). By carbonizing natural/synthetic organic fibers, strong graphite fibers are created. |
| Conductivity | | Due to its single layer, it has a very high electron mobility (pi electrons) which increases conductivity by enhancing the carbon bonds in graphene. Electrons act almost like photons in mobility due to their lack of mass of this two- | |

TABLE 3-continued

Differences in graphene, graphite and Carbon.

| Characteristic | Carbon | Graphene | Graphite |
|---|---|---|---|
| | | dimensional material. High thermal and electric conductivity, greater than copper or silver. Due to the occurrence of quasiparticles (electrons that function as if they have no mass), they can travel long distances while limiting scattering. Graphene is a semimetal whose conduction and valence bands meet at the Dirac points, which are six locations in momentum space, the vertices of its hexagonal shape. | |
| Weight | | .77 milligrams per square meter. A single sheet of graphene which is 1 atom thick can cover a whole football field and would only weigh under 1 gram. | |
| Flexibility | Carbon fiber is very flexible with a high elasticity | Stretches up to 20% without defects, more flexible than carbon fiber | |
| Unique Properties | | Waterproof, eco-friendly, virtually transparent to light, resistant to ionizing radiation, bacterial but allows for the growth of cells | Burned in air, forms carbon dioxide which is used in photosynthesis and the carbon cycle. Due to its weakly-bonded sheets, it can be used as a lubricant in microcrystalline and near amorphous form. |
| Dimension | Carbon structures (3D) | Two-dimensional form of crystalline carbon. Solid material that contains just a single layer of atoms in a pattern. | Parent form of graphitic carbon structures (3D) |
| Stability | Carbon has two stable isotopes, carbon-12 and carbon-13, 14 radioactive isotopes are known, the longest-lived is carbon-14(long half-life of 35-40 years). | | Graphite is more stable than diamond. A diamond persists in its crystal form indefinitely. Pure graphite does not yield diamond when heated under high pressure, and it appears that direct deformation of the graphite structure to the diamond structure in the solid state is not simple. |
| Qualities | The carbon cycle is the conversion of carbon dioxide to carbohydrates through photosynthesis in plants. Animals consume carbohydrates and oxidize them by metabolism to produce carbon dioxide and other products, to return carbon dioxide in the atmosphere. | Can be used as electrodes in dry cells (no liquid/electrolyte) Graphene may surpass silicon to form the next generation of computer chips. Graphene consumes less electricity than silicon when doing the same task | Formed by metamorphosis of carbon material. Graphite is used in pencils, lubricants, crucibles, foundry facings, polishes, arc lamps, batteries, brushes for electric motors, and cores of nuclear reactors. |

The term Pure stable graphene contains a monolayer of carbon atoms. These monolayer layers commonly exist as an ultrathin film. Various techniques have been adopted for graphene film preparation, including chemical reduction, mechanical exfoliation, thermal exfoliation, and epitaxial growth.

Different forms of graphene include GO (graphene oxide), GNPs (graphene nanoplatelets), GNRs (graphene nanoribbons), rGO (reduced graphene oxide), GQDs (graphene quantum dots) and also graphene empowered items like graphene ink, graphene masterbatches etc. Various methods have been developed for its synthesis or the process of producing a chemical compound. Among them, three synthetic approaches have been adopted: (1) Chemical Vapor Deposition (CVD), (2) Mechanical cleavage from natural graphite, and (3) Chemical methods. The CVD method is seen to be very useful for pure and single-layer graphene production while the oxidation-reduction approach using graphite is one of the simplest and inexpensive approaches for the production of graphene and their derivatives. The CVD process produces high-quality and pure graphene films. Among many substrates for graphene production using CVD, Copper is known to yield a high level of graphene. The Cu substrate is known to deliver graphene with fewer imperfections. (The CVD is a reaction assembly in which substrate material is framed; volatile carbon atoms are consolidated and accumulated at the surface of the substrate and disused gases are directed out.)

In an embodiment, single layer graphene is formed by Chemical Vapor Disposition (CVD) Thermal Decomposition of SiC Graphene Exfoliation, whereas graphene oxide is formed by Oxidation of Graphite, Exfoliation of Graphite.

Single layer graphene has no oxygen, graphene oxide has C:O ratio about 2-4, whereas reduced graphene oxide has C:O ratio about 8-246. Young's module (TPa) is 1 for single layer graphene, 0.2 for graphene oxide and 0.25 for reduced graphene oxide. Electron mobility is about 10,000-50,000 about single layer graphene, graphene oxide is insulator and 0.05-200 for reduced graphene oxide.

A split-second, super-hot flash of electricity focused on any items containing carbon—including a plastic water bottle, a piece of worn-out rubber tire or even food waste—reorders the carbon atoms to produce graphene. All other element distills or sublimes out and all one is left with is carbon that takes the most stable formation possible, which is nothing but graphene.

Graphene is the only allotrope of carbon in which every carbon atom is tightly bonded to its neighbors by a unique electronic cloud. Along with the unique quantum hall phenomenon, graphene itself exists in several forms like graphene nanoribbons, graphene nanosheets, graphene nanoplates, graphene nanowires, graphene quantum dots and 3D graphene. The two pi-electrons that are present in every hexagon of the graphene sheets are responsible for the exceptional conductivity of graphene. Due to the tight packing of atoms in the crystal lattice of graphene, it is highly stable, but only in case its size is less than 20 nm, otherwise it is quite unstable thermodynamically except for some specific conditions. The stable properties of graphene solely depend on the number of layers and the defects present in the graphene layers. The surface area of pristine graphene is ~2630 m 2/g is much higher than the surface area of carbon black (850-900 m 2/g), carbon nanotubes (100-1000 m 2/g), and many other analogues.

Single layered Graphene sheet: The carbon atoms in the single layered graphene sheet are only 0.142 nm apart, so not even the smallest gas atoms (i.e., helium) can pass through. These single layered graphene sheets are seen to be a versatile, multifunctional 2-D atomic carbon nanomaterial that clearly has a unique combination of thermal and electrical conductivity along with impressive mechanical properties.

Graphene oxide (GO) Graphite is a 3D material which is built up by millions of graphene layers. Through an oxidation process, oxygen-containing functional groups are attached to the surface of graphite and thus convert graphite to graphite oxide. After sonication of graphite oxide, a single or a few-layer graphene, called graphene oxide (GO), is produced. (Sonication is the process of using energy to move particles around in a solution, typically for the purpose of cleaning or separating different substances.) GO can be transformed into reduced graphene oxide (rGO) through a reduction process and the rGO produced is comparable with that of pure graphene.

The term graphene oxide (GO) refers to as a single monomolecular layer of graphene with various oxygen-containing functionalities such as epoxide, carbonyl, carboxyl, and hydroxyl groups. GO is a 2D polymer consisting of covalently tethered oxygen-derivatized carbon atoms. GO is viewed to be hydrophilic due to its good dispersibility and its attraction in water.

In an embodiment, GO is a compound of carbon, oxygen, and hydrogen in variable ratios, obtained by treating graphene with strong oxidizers. The maximally oxidized bulk product is a yellow solid with C:O ratio between 2.1 and 2.9, that retains the structure of graphene but with a much larger and irregular spacing. GO is usually prepared by Hummer's method.

In an embodiment, GO is used in making nanosheets. The most important property of GO Nano-sheets is antifouling during operation due to negative charge and high hydrophilicity. As a functionalized single atomic layer of carbon, the thickness of GO is approximately 1 nanometer (nm).

In an embodiment, Graphene and GO have completely different adsorptive properties. Graphene is nonpolar, hydrophobic adsorbent as it repels water, and difficult to disperse in water. Contrary to graphene, GO is a polar, hydrophilic adsorbent, it attracts water, that can be applied for preconcentration and separation of organic compounds and metal ions. Due to the huge surface area and large quantities of oxygen-functional groups GO has impressive absorption capacity toward metal ions.

When the GO is reduced with a suitable process, the reduced graphene oxide (rGO) formed resembles graphene. GO and rGO have been known to be best used in nanocomposite materials, polymer composite materials, energy storage, and catalysis.

The term white graphene is also referred to as Hexagonal Boron Nitride or 'hBN', due to its highly transparent nature. At the very atomic level, white graphene material resides in a hexagonal pattern with alternating atoms of Boron and Nitride creating the hexagon. This pattern is isoelectronic to graphene, which means it contains the same number of electrons as well as very closely aligned and near identical hexagonal lattice of carbon that makes up the graphene framework.

In an embodiment, hBN has unique thermoelectric properties. It is a strong dielectric material that is transparent to both electromagnetic waves and radio frequencies, with one of the greatest thermal conductivities of electrical insulators on the face of earth. This is partially determined by the wide bandgap of single-layer boron nitride, roughly 5.97 eV. Boron nitride is a thermally and chemically resistant refractory compound of boron and nitrogen with the chemical formula BN. The hexagonal form corresponding to graphene is the most stable and soft among BN polymorphs, and the cubic variety analogous to diamond is called c-BN; it is softer than diamond, but its thermal and chemical stability is far better.

In an embodiment, two-dimensional (2D) structures such as graphene and white graphene, have unique properties. In its two-dimensional form, white graphene also known as hexagonal boron nitride (h-BN), looks just like the atom-thick form of carbon known as graphene. White graphene's hypothetical estimates of its mechanical properties and its thermal stability are quite comparable to those of graphene.

In an embodiment, white graphene has an ultra-wide band gap of ~6 eV. Therefore, h-BN serve as a dielectric substrate, providing an insulating layer between two graphene layers for graphene-based rechargeable energy storage devices.

White graphene as a material is an excellent thermal insulator, is fire resistant and has the noticeable attributes to provide the unique advantages to materials it is applied in the fields of energy and nanoelectronics. Whereas Graphene is much more stable, flexible, stronger, and is more resilient.

In an embodiment, graphene enhances cathode conductor performance. As well as being very flexible and heat resistant, graphene is also a great electrical and thermal conductor with a very high density not even affected by ionizing radiation.

Graphene oxide quantum dots (GQDs) are multi-layered graphene consisting of up to 10 layers of 10-60 nm size reduced graphene oxide. GQDs display significant characteristics in different applications such as bioimaging, nano sensors, temperature sensing and other nano electronic and optoelectronic applications. GQDs can be utilized in different applications including LED screens, EV batteries, supercapacitors, and solar cells. Graphene nanoribbons (GNRs) is a quasi 1D form of graphene having an ultra-thin strip of graphene having a width of less than 2-5 nm. These Zigzag nanoribbons are semiconducting and exhibit spin-polarized edges. And owing to the edge chirality effect GNRs, are a good candidate for high performance EV batteries.

Graphene aerogels (GAs) act as suitable materials for energy-related applications because of their high mass-specific surface area, elevated electrical conductivity, superior environmental compatibility, lightweight, and their chemical inertness. Because of their porous nanoarchitecture, these materials have been considered as promising candidates for flexible supercapacitors and EV batteries.

Pristine graphene is considered as a unique zero bandgap semiconductor because its conduction band and valence bands. Primary measurements of the thermal conductivity of single-layer graphene exhibit mammoth thermal conductivity of approximately 5300 Wm-1 K-1 This very thermal transport property in graphene and its derivatives has great potential for thermal management applications (especially for the development of high-quality supercomputers). The exact C—C bond length in graphene is around 0.142 nm, which is quite shorter than the normal C—C single bond length and a graphene layer stack to form graphite with an interplanar arrangement of 0.335 nm. These two parameters make graphene the strongest material ever tested in this universe with Young's modulus of 1 TPa (150,000,000 psi) and intrinsic tensile strength of 130.5 GPa. This makes Graphene the ideal candidate for anode/cathode material of the smart rechargeable energy device or the single biggest focus of the present invention.

The zero-band gap of graphene and its engineered analogue with little overlap between valence and conduction band opened huge possibilities for next-generation nano technologies. Graphene could show several charge transporters and carriers up to 1013 cm-2 with a mobility of 1×104 cm2 V-1 s-1 at room temperature and it could be tuned according to real-time applications. The electrical resistance of a graphene sheet is far less than that of silver metal, which makes it highly favorable for nano electronic applications. Graphene has excellent optical, thermal, and mechanical characteristics—up to 2.3% of white light is absorbed by each layer of graphene with a reflectance of less than 0.1%. As the number of graphene layers increases, the absorbance also increases rapidly. Even at its lower conductivity, graphene performs much better than copper. A single layer of stable graphene can withstand up to 42 N m-1 of stresses, with Young's modulus of 1.0 TPa. Among the semiconductors, when electrons fall from the conduction band to the valence band, they emit light and this photoemission process underlies the light-emitting diode (LED) and the semiconductor laser. Two-terminal devices such as light-emitting diode (LED) and solar cells including multi-terminal devices such as integrated circuits (ICs), random access memory (RAM) and read-only memory (ROM) devices, are also some other good examples of semiconductors. Silicon is a critical element that makes up most electronic circuits and devices made of semiconductors, today.

The term graphene alloy is admixture of metals and graphene.

The term dielectric material refers to an electrical insulator that can be polarized by an applied electric field. When a dielectric material is placed in an electric field, positive charges are displaced in the direction of the field and negative charges shift in the direction opposite to the field. In summary electric charges do not flow through the material as they do in an electrical conductor but only slightly shift from their average equilibrium positions causing dielectric polarization.

The term electron conductor is defined as a material which allow electrons to pass through it.

The term catalyst is a substance which increasing the rate of a chemical reaction.

The term ceramic is defined as a hard, brittle, heat-resistant and corrosion-resistant materials.

The term autonomous is freedom to act independently. Autonomous in vehicle is capacity of vehicle that is capable of sensing its environment and moving safely with little or no human input.

The term connectivity network is describing the extensive process of connecting various parts of a network to one another.

The term data processing unit is a programmable electronic component that processes streams of data.

The term user interface (UI) is the point of human-computer interaction and communication in a device.

In an embodiment, battery can be primary and secondary, wherein primary batteries are single use and cannot be recharged and second type is rechargeable and is called a secondary battery.

The term smart thermal management system (STMS) is a nanoelectronics based system that manages temperature which allow for both cooling and self-heating, based on external temperature changes, keeping the internal temperature regulated and promote internal battery cell pack stability and fast charging.

The term sensor is a device, module, machine, or subsystem whose purpose is to detect events or changes in its environment and send the information to other electronics, frequently a computer processor. A sensor is used with other nanoelectronics.' A sensor could be biosensor, chemical sensor such as gas sensor, heat sensor, multi-functional sensor etc. A multifunctional sensor may have potential of both chemical and biosensor.

The term biosensor is an analytical device, used for the detection of a chemical substance, that combines a biological component with a physicochemical detector. The sensitive biological element, e.g., tissue, microorganisms, organelles, cell receptors, enzymes, antibodies, nucleic acids, etc., is a biologically derived material or biomimetic component that interacts with, binds with, or recognizes the analyte under study. The biosensor may include pulse oximeter, heart rate sensor, ECG sensor, skin sensors, temperature sensor, blood pressure sensor, impedance sensor etc. According to one embodiment, all types of biosensor comes under the scope of the present invention.

The term heat sensor is an electronic device that measures the temperature of its environment and converts the input data into electronic data.

The term sensor array is defined as a group of sensors, usually deployed in a certain geometry pattern, used for collecting and processing electromagnetic or acoustic signals and converting them into real-time data for the artificial intelligence (AI) Engine to collect, curate, process and analyze the data to derive predictive analytics and support deep learning through the use of the two-dimensional recurrent neural network (RNNs).

The term Microprocessors is a multi-purpose, programmable devices that accepts digital data as input, processes it according to instructions stored in its memory, and provides results as output. The computational power and the speed or fastness in terms of performance of the microprocessors are determined by the number of transistors that are packed in them. Microprocessors today can easily pack more than 150 billion transistors in each square millimeter of chip.

The transistor count is the number of transistors in a microprocessor. It typically refers to the number of MOSFETs (metal-oxide-semiconductor field-effect transistors, or MOS transistors) on an IC chip. The rate at which MOS transistor counts generally follows Moore's law, which observed that the transistor count doubles approximately every two years. The MOSFET's ease of fabrication made is useful in the manufacture of highly miniaturized integrated circuits measured in nanometers. Further large-scale integration is made possible with an improvement in MOSFET semiconductor device fabrication, also known as the CMOS process.

Moore's Law hypothesized that the number of transistors in a dense integrated circuit and thus the circuit's computational power would double every two years. Moore's law is an observation and projection of a historical trend. With regards to AI, the principal contribution of Moore's Law concerns the evolution of machine learning: the capacity to develop and implement algorithms i.e., the sets of rules that govern calculations or problem-solving activities by computers—that can actually learn from raw perceptual data rather than already delineated information.

The size of MOS transistor is extremely important. Since early 1970s, the linear dimensions of a MOS transistor have shrunk down by a factor of roughly 1,000, and the number of transistors on a single chip has increased by about 15-billion-fold. The metrics used to gauge this enormous progress in integration density where primarily dimensions called the metal half-pitch and gate length. While metal half-pitch is half the distance from the start of one metal interconnect to the start of the next one on a chip, gate length on the other hand measured the space between the transistor's source and drain electrodes. That space essentially incorporated the device's gate stack, which controlled the flow of electrons between the source and drain. For a very long time, it was the most important metric for determining transistor performance, because a shorter gate length suggested a faster-switching device. These defining features of chip-manufacturing technology features on the microprocessors drove smaller chips with each generation. Such a reduction enabled the doubling of transistor density.

A chip-manufacturing technology relies on light with a wavelength of 13.5 nanometers. The technique fashions chip features that are some 0.35 micron wide. Making features half as wide would need to yield transistors four times smaller, since the device is essentially two-dimensional. It can become very challenging to make such tiny parts using light because light waves are just too wide. Which means chip features will eventually stop shrinking.

In an embodiment, microprocessor chipset is built on a 5 nm silicon and integrates 15.3 billion transistors. Chipmaking uses monolithic 3D integration, adding tiers of devices and have been exploring ways to produce monolithic 3D ICs, chips where layers of transistors are built atop one another. It is challenging, because silicon-processing temperatures are usually so high that building one layer normally damages another. This leads to the need to use organic pure carbon-based single layered graphene as the active material in microprocessors, quantum processors, integrated chips, and other nanometer scale chipsets particularly because of graphene's self-healing capabilities. Quantum computing is the exploitation of collective properties of quantum states, such as superposition and entanglement, to perform high performance computation. Binary encoding of data is fundamental to computing, with bits comprising zeroes or ones. Quantum computing brings about a paradigm shift to conventional computing by replacing bits with qubits that can simultaneously manifest multiple states as they are generally defined in classical physics. Quantum systems that represent data using qubits and quantum phenomena such as superposition and entanglement potentially enable computing at unprecedented levels of massive parallelism. The devices that perform quantum computations are known as quantum computers. They are believed to be able to achieve high performance and are expected to power breakthroughs across most computing disciplines, using quantum processors that rely on pure carbon graphene as the active material.

The term Silicon carbide (SiC) is also known as carborundum, is a semiconductor containing silicon and carbon. It occurs in nature as the extremely rare mineral moissanite. SiC is a semiconductor material as an emerging material for applications in semiconductor devices. SiC is to be used in semiconductor electronics devices including microprocessors that operate at high temperatures or high voltages, or both. Large single crystals of silicon carbide can be produced by the Lely method and they can be cut into gems known as synthetic moissanite. The Lely method is used to produce silicon carbide crystals through the process of sublimation. Silicon carbide powder is loaded into a graphite crucible, which is purged with Argon gas and heated to approximately 4,500° F.

The term conductor signifies to substance that has a very small energy gap between the valence band, also known as the atom's outermost electron orbital, and the conduction band, its value generally close to 0. In this case, the electrons can easily jump from one band to another when excited and is in summary considered to be a good conductor.

The term insulator signifies to substance that has a much larger gap between the valence band and conduction band, value around 6, and in this case, the electrons do not have the option to easily jump from one band to another and is in summary considered to be a good insulator.

The term semiconductor signifies to substance that has a band gap value that can be controlled and manipulated externally by an applied field. Semiconductors can be split into two groups. Intrinsic semiconductors have a band gap that is around thermal energies, so a few electrons can be promoted from the valence to conduction band at room temperature. Extrinsic semiconductors are just intrinsic semiconductors that have been doped with impurity atoms (one dimensional substitutional defects in this case). Doping is the process where semiconductors increase their electrical conductivity by introducing atoms of different elements into their lattice. Extrinsic semiconductors are strategically doped with impurity atoms, and this creates new states in the band gap. These extra states can either accept electrons from the valence band or donate electrons to the conduction band. A semiconductor has an electrical conductivity value falling between that of a conductor, such as metallic copper, and an insulator, such as glass. Semiconductors use electronic conduction in the solid state and are very similar to insulators. Pure semiconductors and insulators, in the absence of applied fields, have roughly similar electrical properties. Some good examples of semiconductors are graphene, silicon, germanium, gallium arsenide, and elements near the so-called 'metalloid staircase' on the periodic table. This makes Graphene the ideal candidate for semiconductor material that can support and achieve the high-performance Quantum Computing.

An embodiment relates to a solid-state battery in which the electrolyte that conducts the electric current is to be in a pure carbon-based solid state, rather than a liquid, toxic state as used in most conventional lead acid and li-ion rechargeable batteries today. This would drastically reduce toxicity and improve the use of energy and thus the overall CO2 balance. Also greatly reducing battery weight and flammability by using organic carbon-based materials could also have a big impact on recycling by allowing easy and safer transportation and disposal of recycled EV batteries.

In an embodiment, rechargeable energy storage device such as an electric vehicle battery consists of a collection of cells or cell assemblies, with housing, electrical connections, and possibly supportive nano electronics such as a smart thermal management system (STMS) and energy management system (EMS) for control and protection.

The demand for higher-energy-density rechargeable energy storage device creates the interest in the exploration of an organic pure carbon-based material such as 'graphene' as an anode material. In an embodiment, apparatus or method of original lead acid and li-ion battery cells are to be replaced with single layered single atom thick sheet of graphene and white graphene sheet materials. Graphene is made of all pure carbon. It is ultra-light, yet very tough, 200 times stronger than steel, but is also very flexible, fire-resistant, and is also a great conductor. Graphene is highly conductive and can carry 1000× times the density of electrical current when compared to copper. It is fire resistant yet retains heat. Stacking of ten or more layers of graphene would be graphite which is simply pencil lead. Since 2013, a conventional commercial battery pack contained 7104 small battery cells, slightly larger than the standard AA cells. These were conventional cylindrical cells which were 18 mm in diameter and 65 mm tall providing 85 kWh of energy. In 2017 the cell pack was modified to a total of 8,256 cells to provide 100 kWh of energy with a range of ~300 miles. The cell pack was modified to be 21 mm in diameter and 70 mm tall resulting in 4,416 li-ion cells providing a range of ~350 miles. These were recently modified to be 46 mm in diameter and 80 mm tall, resulting in 960 li-ion cells inside the battery pack providing a range of ~600+ miles. The maximum charging voltage for a conventional cell today is 4.2 volts with a maximum charging current of 2 amperes per cell. Therefore, the maximum power that a EV battery pack can use for charging is 4.2×N×I where N is the number of cells in the pack and I is the maximum current allowed per cell. For 85/90 kWh packs this is 7,104×16.8=119.3 kW. For the 100 kWh packs it is 8,256×16.8=138.7 kW.

Presently, for a normal energy vehicle battery, two sizes of batteries are commonly used. One battery has a size about 7000 odd double A size batteries, and the other has 15,400 double A size batteries: and a metal casing. The presently used batteries has cobalt, acid etc. that makes the batteries very heavy.

In an embodiment, we are using graphene as the active material. Therefore, a weight of the battery size is reduced by the rate by almost 10 times or more, such as but not limited to 15 times, 20 times, 25 times, 35 times, 50 times, 75 times, 100 times or more.

Further, in the same size of battery with graphene as that material, we can hold very large number of flexible graphene cells such as but not limited to 7000, 7500, 8000, 10000, 15000, 17000, 20000, 30000, 60000 or more. So, this will exponentially increase energy density of the battery compared to conventionally used Li batteries.

An average electric vehicle in the US drives about 12,000 to 14,000 miles a year. On a single charge, the pure organic graphene-based batteries can very easily achieve the needed energy capacity density and when converted to miles, a single quick charge can provide almost a few years of driving capacity or almost 30,000 miles, 60,000 miles, 100,000 miles, or more. It can remain active and surpass the life of a normal electric vehicle.

Graphene can conduct 10× times better than copper. For example: the smallest bit of graphene charged for 2 seconds could electrify a LED bulb for almost a few minutes. One square meter of graphene weighs less than 1 milligram. Free-form graphene can flow freely without collisions, at speeds approximately 1/10 of the speed of light in a vacuum.

In an embodiment, graphene cell has a Self-Healing property. The single-layer Graphene sheets can self-repair holes in its sheets, when bombarded with molecules containing carbon, such as hydrocarbons. Bombarded with pure carbon atoms, the atoms perfectly align into hexagons, completely filling the holes. Ref: "Graphene re-knits its holes". Mesoscale and Nanoscale Physics.

Graphene, when bombarded by carbon atoms, because of its unique hexagonal shape with self-healing properties, graphene initially tends to break and automatically heals and reverts to its original shape. This means long lasting battery cells, which can solve safety hazards such as thermal runaway, explosions, fires, degradation of cells, and other dangerous flammability issues.

In an embodiment, graphene cell has a regenerative charge potential.

Regenerative charge is a result of regenerator heat that is created due to various reasons within the vehicle. Various forms of heat and useful frictional energy is generated by the normal functioning and operation of the electric motor and the electric generator. One of the various functions is breaking, which results in frictional energy that then results in regenerator heat. That heat is captured and diverted towards the EV battery. So, any amount of friction and consequential heat that is created, is repurposed. And that heat is consumed by the STMS for the purpose of battery is consumed, that results in charge of the back of the cells everything else is released during cold weather time in the vital vehicle's cabin. This helps in self-charging of the graphene battery. The repurposed heat is effectively managed by the STMS and intelligently converted to a useable charge for the purpose of the EV batteries ingestion. The repurposed energy is efficiently utilized to charge and equilibrize the cell packs. During cold weather temperatures any additional heat that gets converted to energy that again get converted to heat is released to the vehicle's internal cabin and to maintain the temperature around the cell packs without having to load or drain the EV battery. This helps in not only conserving the EV batteries charge but also in self-charging the carbon-based graphene battery. The end result being 'extended and enhanced range' thus solving the 'Range Anxiety'

In an embodiment, single-layer graphene is a hundred times more chemically reactive than thicker multilayer sheets.

In an embodiment, Graphene has the highest ratio of edge atoms of any allotrope. Defects within a sheet increase its chemical reactivity. Ref: "Comparative Study of Defect Reactivity in Graphene". Journal of Physical Chemistry C.

In an embodiment, the single atom thick sheet of graphene has major advantages by possessing super conductivity as well as its strength and surface to volume ratio. It has an electrical conductivity of the order of 1,000 siemens per meter and thermal conductivities between 1,500 and 2,500 Wm-1K-1. Graphene has a tensile strength around 130 GPa. As a comparison, silicon has an electrical conductivity of 1,000 siemens per meter, a thermal conductivity of 150 Wm-1K-1, and a tensile strength of around 170 MPa. Graphene has an extremely high electron mobility (250,000 cm2/Vs), and an extremely high thermal conductivity (5,000 W/m K), among other desirable properties.

In an embodiment, Graphene is an active raw material for sensors, more preferably to biosensor.

Graphene exhibits a broad electrochemical window of approximately 2.5 V in 0.1 moles per litre of phosphate buffered saline. It has a low charge-transfer resistance around 6.5 MΩ cm2

In an embodiment, graphene is an active raw material for multi-functional sensor.

In an embodiment, Graphene is able to be functionalized through the addition of functional groups which affects its reactivity. This makes graphene ideal for use as sensors in the newer generation rechargeable energy storage devices.

In an embodiment, 'Controlled Functionalization' and the consequent use of 'Sodium-ions' as another effective alternative to lithium-ions.

In one embodiment, the invention uses molecule spacers or separators while stacking the single layer graphene sheets in the carbon-based cell packs particularly owing to their asymmetric chemical functionalization on opposite faces of the graphene. Graphene and its derivatives functionalized or doped with metal oxide nanoparticles can be used in high-performance supercapacitors and carbon-based cell packs.

In an embodiment, controlled functionalization of single layer graphene sheets is seen to be very effective in the development of the next generation energy storage devices and supercapacitors. The dangling bonds at the edge of the single layer graphene sheets can be used for the covalent attachment of various chemical moieties while the graphene basal plane can be modified via either covalent or noncovalent functionalization. The asymmetric functionalization of the two opposite surfaces of individual single layer graphene sheets with different moieties can lead to the self-assembly of graphene sheets into hierarchically ordered structure. Graphene can be produced simply by a manual cleavage of graphite using an everyday Scotch tape, or using various other approaches that include epitaxial growth on single-crystal SiC, chemical vapor deposition (CVD) on metal surfaces, hummer's method, chemical coupling reactions, exfoliation of graphite via solution oxidation, or sonication/intercalation. It is seen that one can produce solution processable graphene oxides (GOs) and edge-functionalized graphene (EFG) sheets from the simple exfoliation of graphite powder. And it is also seen that graphene sheets without functionalization are seen to be limited in their large-scale practical applications. Covalent functionalization of the graphene basal plane could cause significant distortion of the π-π conjugation and the associated physicochemical properties. Functionalized graphene materials have been used as either low cost metal-free catalysts or catalyst supports with outstanding performance leading us to consider sodium-ion as another effective catalyst instead of the expensive lithium material.

Sodium is an abundant low-cost alkali metal. Sodium is a very soft silvery-white metal and is the sixth most abundant on earth. It is a main ingredient in seawater and common everyday household salt. Sodium is a chemical element with the symbol Na (from Latin natrium) and atomic number 11. Sodium metal can be easily cut with a knife and is a good conductor of electricity and heat because it has only one electron in its valence shell, resulting in weak metallic bonding and free electrons, which carry energy. Due to having low atomic mass and large atomic radius, sodium is third-least dense of all elemental metals and is one of only three metals that can float on water, the other two being lithium and potassium. The melting (98° C.) and boiling (883° C.) points of sodium are lower than those of lithium. This could make sodium-ion another desirable alternative for reducing our dependency on the expensive mined materials like lithium. It can be seen that the desired capacity for sodium ions is almost ten times that of the capacity of sodium intercalation in standard graphite. It is estimated that the energy density reaches 337 mAh/g. The upper face of each dual stacked graphene sheet has a molecule that acts as both spacer and active interaction site for the sodium ions. Each molecule, in between the two stacked single layer graphene sheets, is connected by a covalent bond to the lower graphene sheet that effectively interacts through electrostatic interactions with the upper graphene sheet. The single layer graphene sheets are designed to have a controllable functionalization density and the needed extra anodized edges. An electrochemical process known as 'anodizing' helps breaks down the graphene sheets such that more edges are created. Measuring the properties of anodized graphene edges allows the capacity of the graphene material to store electric charge greatly increases and becomes quite high. By adding the molecule separators or spacer between the stacked single layer graphene sheets, the molecule effectively separates the graphene sheets and provides an interaction point which could then lead to a significantly higher capacity. It is seen that one side provides interaction sites while the other provides inter-layer separation. The ions intercalate, which means that they can move in and out of the single layer graphene sheets and can be used to increase the storage capacity by storing every bit of additional energy. The asymmetric controlled functionalization of the two surfaces of individual graphene sheets with varying nanoparticles, is seen to be effective for use of the functionalized graphene sheets to develop 3D self-assembled functional electrodes. The invention is designed to stack the graphene layers in an ordered structure to allow for high performance and thus provide higher energy capacity and emphasizes the versatility of surface functionalization for making sophisticated graphene materials for ultra-capacitors and next-generation energy storage device. The invention further stresses on developing high energy density anodes and cathodes with sodium-ion as the active material. Similar to most li-ion cathodes, sodium-ion cathodes also store sodium via intercalation reaction mechanism.

Though there are numerous methods of graphene preparation, the key here is the preparation of high-quality graphene for energy conductivity, energy catalysis, and energy storage applications. In an embodiment, present invention relates to stable graphene rather than commonly used alternatives such as graphene oxide or reduced graphene oxide, which are seen to have known defects. In an embodiment, present invention relates to not only the use of stable pristine graphene but also the commonly used alternatives such as graphene oxide or reduced graphene oxide, which are seen to not only have known defects but also some advantages.

In an embodiment, smart rechargeable energy storage device comprises of about a 1000 or more extremely lightweight pure carbon-based organic nano cells. In an embodiment, smart rechargeable energy storage device comprises of about a very large number of flexible graphene cells such as but not limited to 7000, 7500, 8000, 10000, 15000, 17000, 20000, 30000, 60000 or more or more extremely lightweight pure carbon-based organic nano cells.

An embodiment, smart rechargeable energy storage device comprises inorganic electrolytes such as ceramics and glasses as well as pure carbon-based organic electrolytes.

In an embodiment, the EV battery is a solid-state battery wherein the electrolyte that conducts the electric current is to be in a pure carbon-based solid state.

In an embodiment, electrode material in battery has organic pure carbon-based biodegradable 2D transition metal carbides, carbonitrides, and nitrides.

In an embodiment, a rechargeable energy storage apparatus, comprise of: (a) a system, apparatus or method composed of a cell which includes a positive electrode or cathode that contains a single layered pure carbon-based positive electrode sheet which is the active material that consists of graphene oxide as well as a positive grid that contains a graphene alloy. (b) a system, apparatus, or method composed of a cell also containing a negative electrode, or anode that is active material consisting of a single layered pure carbon-based negative electrode sheet made of a sponge-like graphene material and a negative grid also consisting of a graphene alloy. (c) cells, in which multiple grids are used to hold the pure carbon-based active material and are designed to work as a current collector, also known as an electrical conductor between the electrodes and the external circuits for support of the coating of the electrode materials. (d) each cell, containing separators that create a barrier between the anode and cathode while allowing for the exchanging of electrons from the anode to the cathode since electrons have a negative charge and attract to positive charges and allow for the movement of ions. (e) each cell, consisting of a solid, wafer-thin ceramic sheet that filters the electrons as it passes from the cathode part of the battery to the negative electrode (f) multiple positive electrodes and negative electrodes, forming multiple single layered pure carbon-based graphene cell sets which are then combined to create a pure carbon-based graphene cell pack or cell block that form the single battery cell pack of the apparatus.

Separators and organic separators are interchangeably used.

In an embodiment, separators made up of pure organic carbon-based graphene pads allow expansion and contraction based on the thermal energy that's going into the cells. separators and separator pads are designed to function as a kind of cushion that not only barricades but also holds the graphene cells from disintegrating.

In an embodiment, compression pad can be made up of graphene alloy. The graphene alloy could contain graphene ceramic composite material.

Graphene is lighter than air, therefore, it reduces the overall weight of an individual cell. So, if the individual weight of every cell is reduced greatly by almost 10 times or more such as but not limited to 15 times, 20 times, 25 times, 35 times, 50 times, 75 times, 100 times or more., which means that, at a tenth of the size of the Tesla battery weight and size, we can pack almost four times or five such as but not limited to 10 times, 15 times, 20 times, 25 times, 35 times, 50 times, 75 times, 100 times or more times graphene cells.

In an embodiment, graphene battery may give about 500 weight per kg energy density, that will go to 2000, which means that is range of almost 2000 miles could be covered.

In an embodiment, graphene battery may deliver about 1000 Wh/kg, 1500 Wh/kg, 2000 Wh/kg, 2500 Wh/kg, 3000 Wh/kg, 4000 Wh/kg, 5000 Wh/kg, 6000 Wh/kg, 7000 Wh/kg, 8000 Wh/kg, 9000 Wh/kg, 100,000 Wh/kg or more thus, offering a range of 650 miles, 750 miles, 800 miles, 1000 miles, 5000 miles, 7500 miles, 10,000 miles, 15000 miles, 30000 miles, 60000 miles or higher on a single charge depending on the size of the EV battery and the consequent number of cells pack housed in the EV battery casing.

In an embodiment, graphene reducing the weight 10 times and are increasing four or five times or more, such as but not limited to 10 times, 15 times, 20 times, 25 times, 35 times, 50 times, 75 times, 100 times or more the energy charge capacity. In an embodiment, reducing the weight of the graphene based EV battery by almost 10 times or more, such as but not limited to 15 times, 20 times, 25 times, 35 times, 50 times, 75 times, 100 times or more and thus increasing the energy charge capacity by almost 5 times or more, such as but not limited to 10 times, 15 times, 20 times, 25 times, 35 times, 50 times, 75 times, 100 times or more.

Figure 7:
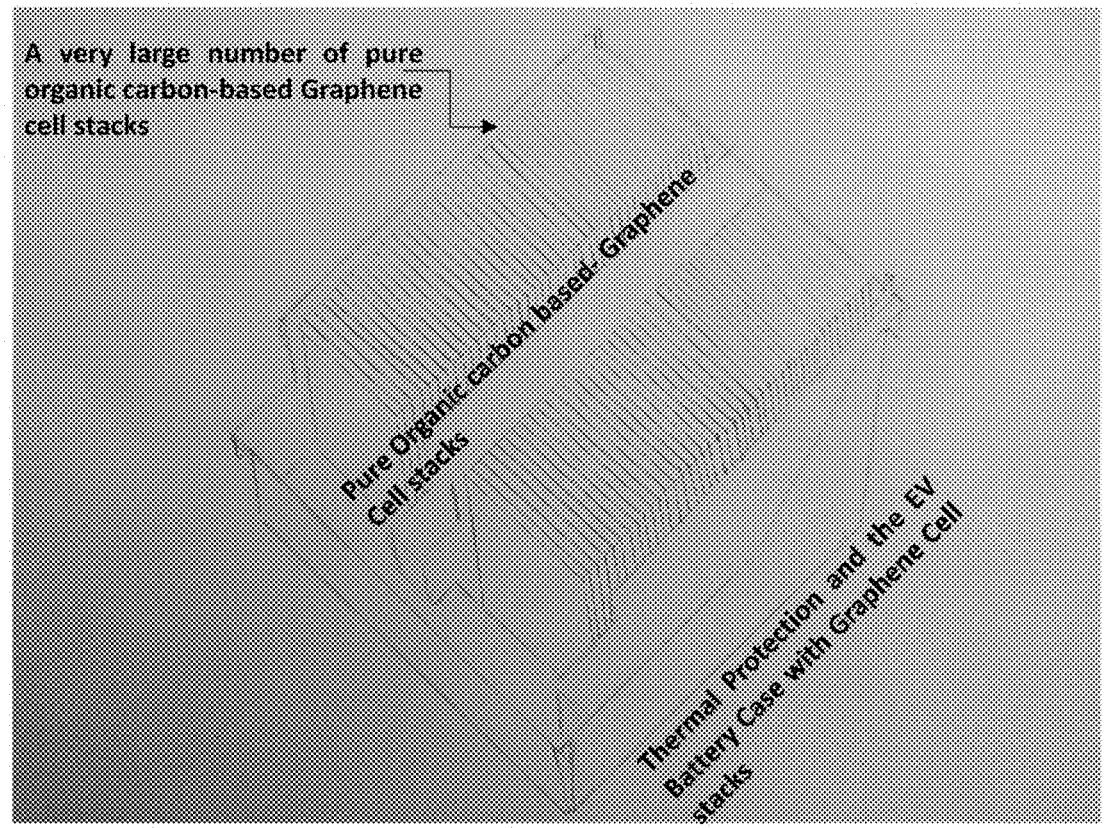
FIG. 7 shows stacking of graphene cells in an Electric vehicle battery.
Figure 8:
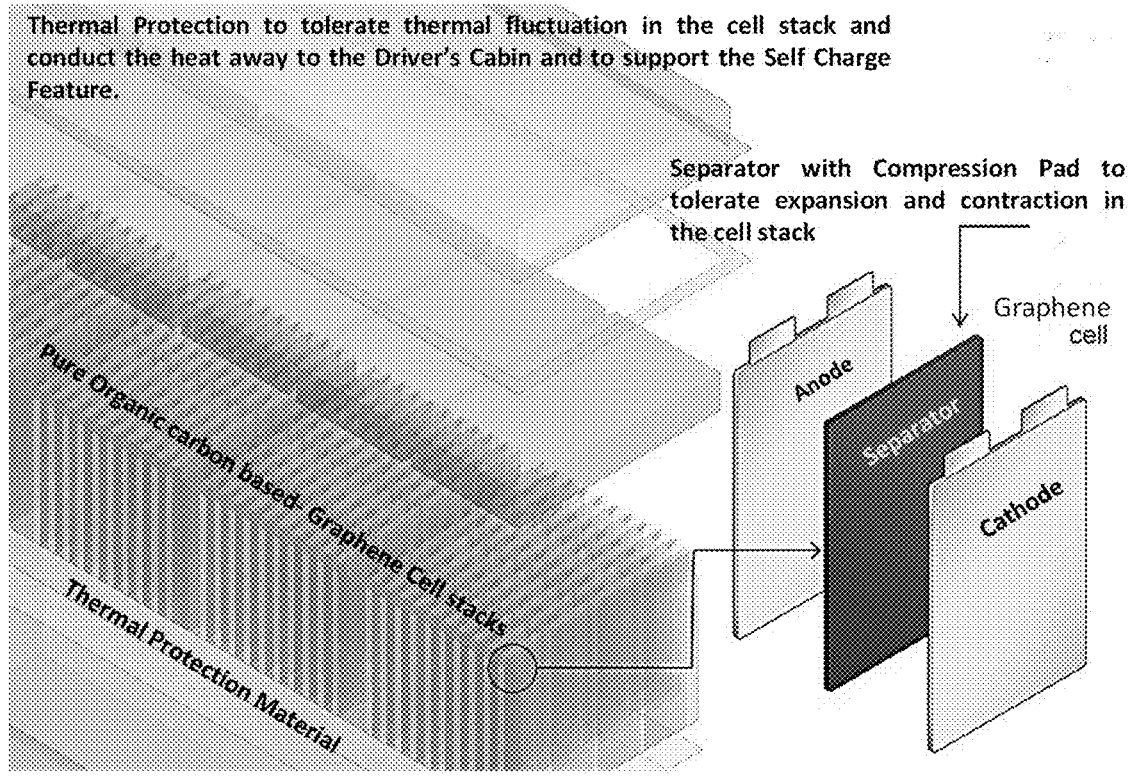
FIG. 8 shows an arrangement of anode, cathode and separator in a graphene cell. The graphene cells are stacked in a battery.
Figures 9, 10:
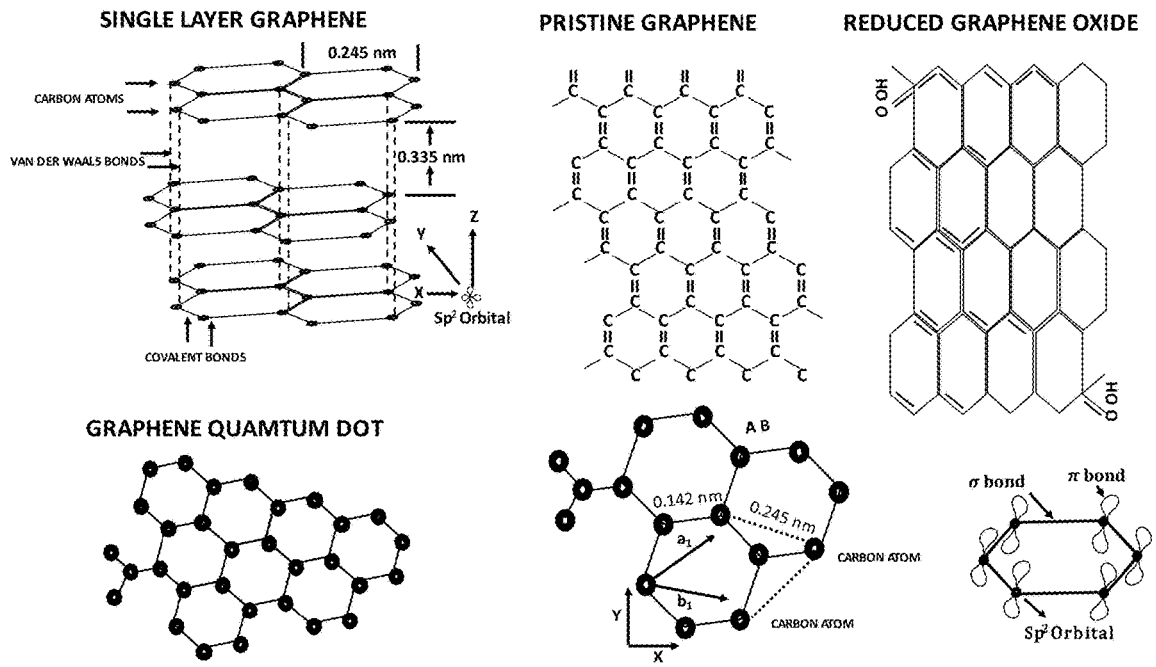
FIG. 9 shows different types of graphene.
FIG. 10 shows graphene, graphene oxide and reduced graphene oxide along with its properties according to one embodiment.
Figure 11:
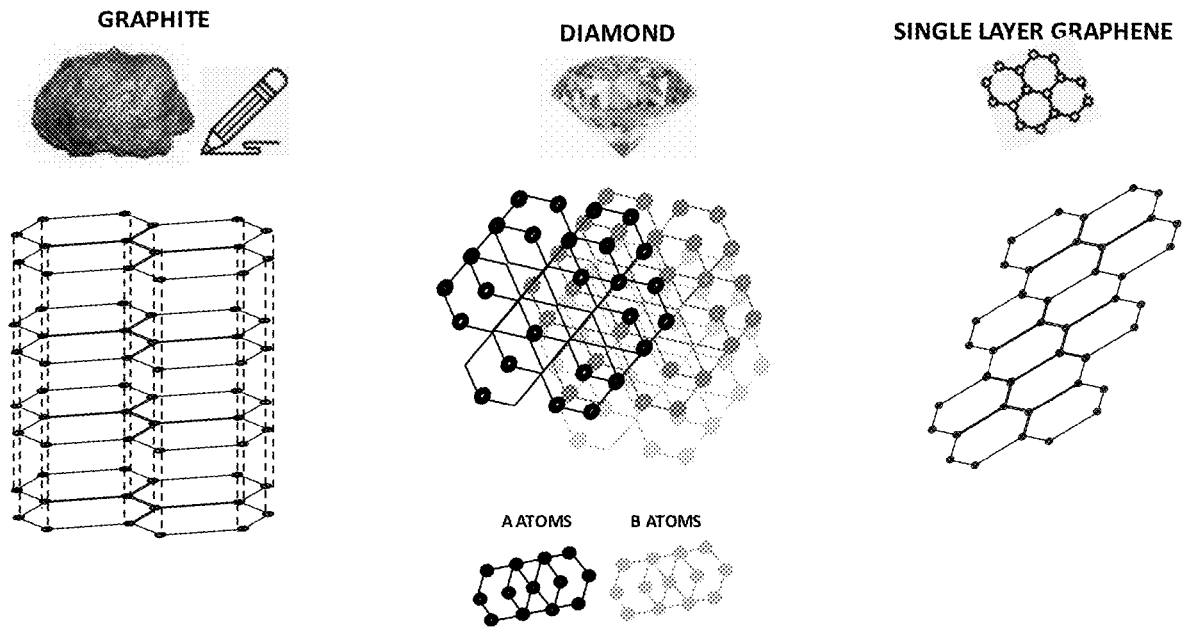
FIG. 11 illustrates different types of allotropes of carbon.
Figure 12:
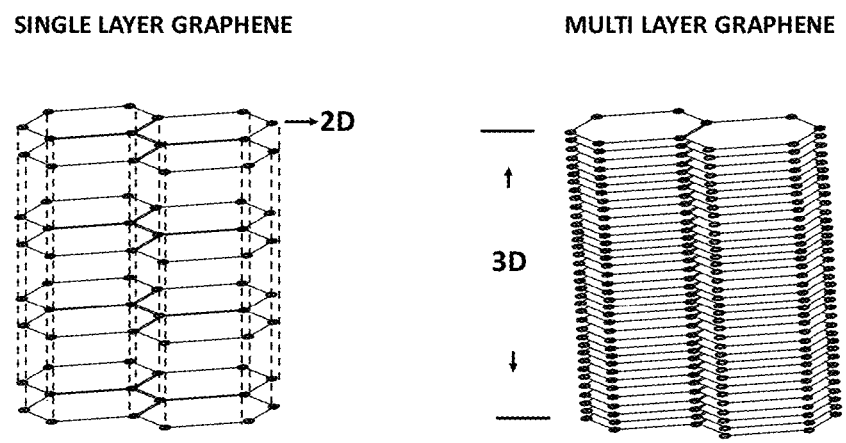
FIG. 12 shows single layer graphene and multilayer graphene.
Figure 13:
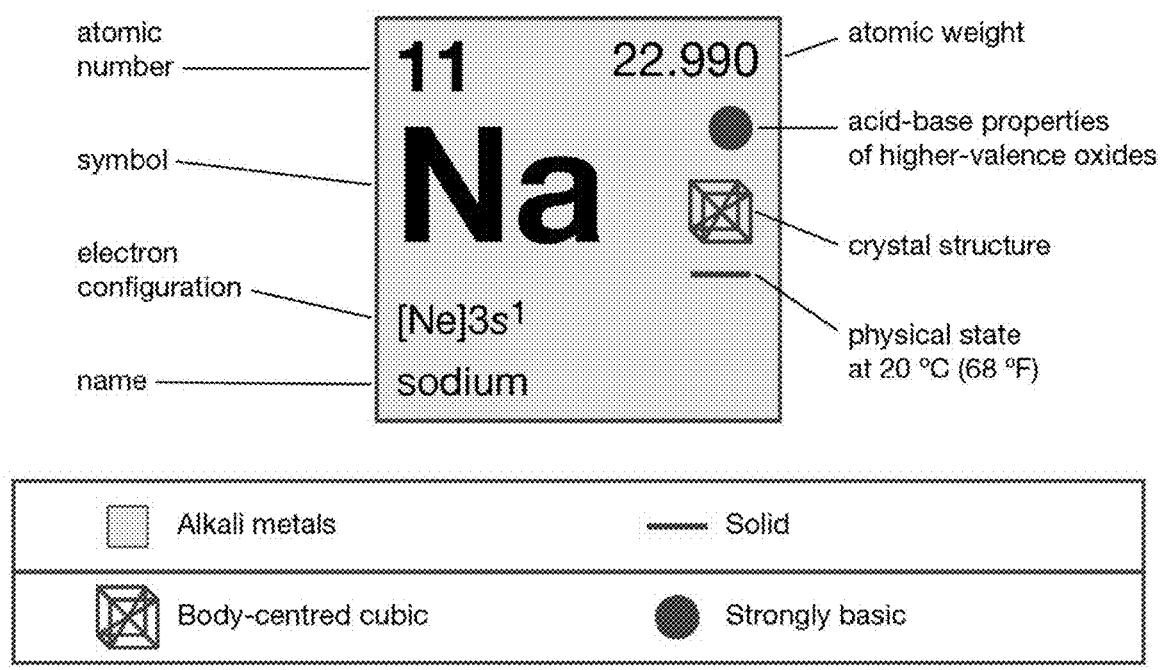
FIG. 13 shows sodium details such as sodium symbol and sodium properties.

FIG. 7 and FIG. 8 provides stacking of graphene cells in a battery. This design, enables greater orchestration of the active materials, integrated with organic graphene cells, to allow a significant increase in volumetric and gravimetric energy. In an embodiment, this design also allows homogeneous temperature distribution throughout by providing a more efficient heat dispersion to allow effective regenerative energy usage.

In an embodiment, is connected to a STMS that controls the proper operation of each cell to ensure safe and optimum operations that is within predefined thresholds—voltage, current, and temperature In an embodiment, the graphene battery is connected to an EMS for optimizing electric power consumption to improve both the battery life and energy economy of an EV by optimizing efficient energy flow In an embodiment, the graphene battery is connected to the DC-DC and AC Inverters, to convert power effectively and reduce energy overload or energy wastage.

In an embodiment, this design is composed of several cell packs and multiple energy sources inter-connected to maintain the optimum value of charge, voltage and overall range In an embodiment, this design is connected to an efficient monitoring and control module to autonomously detect, control and simulate fault operations, promotes higher energy density to enable longer and extended driving range, improves mechanical stability, interoperability with supporting nanoelectronics, and better handle battery stress, especially for emerging chemistries, allows for the trade-off between power and energy for all kind of active materials—optimal power to energy ratio.

In an embodiment, apparatus, or method, wherein graphene and white graphene sheet materials is used in highly efficient electric vehicle rechargeable energy storage batteries and electrochemical capacitors since the graphene and white graphene material can yield layers with exceptional charge capacities for use in the next-generation technology of rechargeable energy storage devices that are specifically used in electric vehicles, small computer devices and unmanned user vehicles.

In an embodiment, band gap of white graphene can be modified and become significantly tuned by lattice straining or distortion to allow for more efficient and reliable power.

In an embodiment, carrier density of graphene improves due to the ultra-flat surface and lattice mismatch of h-BN. Charge carrier density, also known as carrier concentration, denotes the number of charge carriers in per volume. In SI units, it is measured in $m^{-3}$. The carrier density is important for semiconductors, where it is an important quantity for the process of chemical doping. Carrier density represents the number of carriers that participates in conduction, which is one of the key factors contributing to electrical conductivity.

In an embodiment, difference between graphene and white graphene is that h-BN is a natural insulator, where perfect graphene presents no barrier to electricity and is a very reliable semiconductor. At the same time, both materials exhibit extremely high defect tolerance and elasticity. Both these two-dimensional (2-D) materials have different band gaps (from 0 to 6 eV), and range from conductors, semiconductors to insulators, and hence can successfully illustrate their potential in rechargeable energy storage electronic applications and nanoelectronics such as integrated circuits. It is because of this unique physical, chemical, electrical and optical properties, both the 2-D materials have potential in rechargeable energy storage electronic applications according to various embodiments of this invention.

In an embodiment, white graphene material greatly compliments graphene and can greatly improve the performance of the newer rechargeable energy storage devices and nanoelectronics such as integrated circuits that use graphene as the key component. This atomic level super capacitor and super conductivity performance may be enhanced even further when the graphene layer is combined with 'white graphene' or hBN. Single-layer boron nitride also described as white graphene simply because it is white in appearance and is structurally analogous to graphene. The white color arises due to the material's wide bandgap, yet it will typically appear transparent when deposited in a few atomic layers to a substrate of silicon (Si) or copper (Cu).

In an embodiment, 2D structures of graphene and white graphene with a wide range of chemistries and unique characteristics led to identification of useful properties of 2D carbides and nitrides, which are binary compounds existing with either carbon or nitrogen and another more electropositive element, oxycarbides which are compounds that include oxygen, carbon and other various elements, as well as other related structures, to result in new applications in rechargeable energy storage devices and nanoelectronics such as integrated circuits.

The unique properties such as tunable interlayer spaces, excellent hydrophilicity, extraordinary conductivity, compositional diversity, and abundant surface chemistries, make rechargeable energy storage technologies useful not only for electrode materials but also as other components in the cells of the new electric vehicle batteries.

In an embodiment, new electric vehicle batteries include various properties such as electrodes, metal anode protective layers, separator modification layers, extraordinary conductivity and more. Graphene is an excellent conductor of heat and electricity like metals, it, among many of its various forms, are also elastically stiff, strong, brittle, and heat tolerant. It is highly resistant to chemical attack, readily moldable, and damage tolerant as they can be highly oxidation resistant.

In an embodiment, a next generation highly efficient rechargeable energy storage batteries is to be composed of tens of thousands of cells that intelligently support and reinforce each other. This design is to support large rechargeable energy storage devices to charge almost 90% of the cells in a matter of few minutes.

In an embodiment, rechargeable energy storage devices to charge almost 90% of the cells in a matter of few minutes with the lower limit as 0.5 mins, 1 mins, 2 mins, 3 mins, 5 mins, 7 mins, 10 mins, 15 mins, 30 mins; and the upper limit as 30 mins, 40 mins, 45 mins, 50 mins, 55 mins and above.

These next generation energy storage devices with thousands of highly efficient self-charging cells, would provide the ability to quick charge, the most needed long range, and solve the safety challenges of dendrite formation and the consequent inflammability and explosion. This new design is to increase battery safety and reduce fire hazards, by using safe non-flammable electrolytes and with highly enhanced performances. Also, parts of the newer rechargeable energy storage batteries will not only desist from using toxic materials and extremely expensive mined rare earth metals but may actually turn out to be biodegradable. It can be seen that when exposed to an open flame, today's commercial li-ion batteries caught fire and burned vigorously until all the electrolyte burned away, but in batteries with the new flame-retardant carbon-based material, the fire never really got going, and hence did not flare up.

In an embodiment, heat sensors are imbedded in the pure carbon-based cells would regulate and promote self-heating. Self-heating sensors installed in the pure carbon-based cells are to prevent power drain and internal damage particularly in sub-zero temperatures since external cold temperatures impede the charging rate of conventional battery cells.

In an embodiment, the system is to be extremely lightweight, graphene-based anode-free batteries that is to be an attractive feature for drones and many other smaller consumer electronics. It is noticed that some unique surface chemistries, such as the presence of high conductivity and high surface area make the pure organic carbon form, single-layered graphene, potentially attractive for catalytic applications.

In an embodiment, external (STMS) that manages temperature may allow for both cooling and self-heating, based on external temperature changes, keeping the internal temperature regulated and promote fast charging and also self-charging. As the electrons flow increases, the internal cells heat up allowing for more rapid charge and long range by arresting any possible loss of capacity.

In an embodiment, apparatus having graphene based cathodes, anodes, electrolytes and other components nearly triple the amount of electricity that a normal li-metal battery can deliver from about ~180 Wh/kg to ~300 Wh/kg. A higher energy-to-weight ratio is key to solving the limited range drawback that electric batteries face today.

In an embodiment, the graphene cell batteries according to one of the embodiments of this invention can deliver about 1000 Wh/kg, 1500 Wh/kg, 2000 Wh/kg, 2500 Wh/kg, 3000 Wh/kg, 4000 Wh/kg, 5000 Wh/kg, 6000 Wh/kg, 7000 Wh/kg, 8000 Wh/kg, 9000 Wh/kg, 100,000 Wh/kg or more.

In an embodiment, graphene based batteries can deliver 2 times, 4 times, 5 times, 10 times, 20 times, 30 times, 40 times, 50 times, 5 times, 100 times, 120 times, 150×, 200× 1000× of li-ion battery.

The graphene material does not react easily with its surroundings due to the high quality of the graphene layer and its innate inertness.

In an embodiment, pure carbon-based materials are to make rechargeable energy storage devices and other such semiconductor devices much more efficient as they are capable of powering themselves and can even be used to harvest wasted frictional energy. The carbon-based active materials possess high electrical conductivity and the ability to uptake electrons due to frictional energy. In an apparatus, the friction can be the force resisting the relative motion of solid surfaces, fluid layers, and material elements sliding against each other. Kinetic friction is, in many cases, to be primarily caused by chemical bonding between the surfaces When surfaces in contact move relative to each other, the friction between the two surfaces would convert kinetic energy into thermal energy. For present purposes kinetic friction at nanoscale is leveraged by thermodynamics. Even very small-scale gas interactions are described by the kinetic theory of gases. Thermodynamics deals with heat, work, and temperature, and their relation to energy, radiation, and physical properties of matter.

Energy recuperative mechanisms that includes regenerative braking is a smart technique that is used to capture energy that the electric vehicle generates due to its motion such as heat generated due to friction in the brakes, or in other words, its kinetic energy that would have been wasted when the vehicle decelerates or comes to a standstill while braking. It is a simple energy recovery mechanism that slows down a moving vehicle or object by converting its frictional or kinetic energy into a form that can be either used immediately or stored using a smart energy storage device until needed. Regenerative braking system is used to recover the kinetic energy dissipated as heat during braking in the traditional braking method. Going by the laws of physics, one may not recover all of the kinetic energy that is lost but still significant amount of kinetic energy can be converted and stored in battery or Supercapacitor. The energy recovered helps in extending the range in electric vehicles.

When brakes are applied in electric vehicles, the motor controller reduces the performance or stops the motor. During this operation, the motor controller is designed to recover the kinetic energy and store it in the battery or the capacitor banks. When the motor accelerates the vehicle, the kinetic energy associated with it increases as a square of the velocity. During coasting, the vehicle comes to rest when the kinetic energy becomes zero. When we apply the brakes in an electric vehicle, the motor controller operates in such a way to bring the motor to rest or to reduce its rpm and thus its speed. The controller acts according to the input from the brake pedal sensor and carries out that operation. During this process, the motor controller will reduce and set the supply frequency. From the motor controller perspective, the speed of the motor is more than its synchronous speed. As we reduce the speed during braking operation, the motor now acts as a generator until the rpm decreases and sets to lower frequencies. This involves in reversing the direction of the motor torque to that of the direction of rotation. During this process, the rotor of the motor connected to the drive axle generates an electromotive force (EMF) in the motor (analogous to a turbine driving the rotor of the generator). When the EMF generated is more than the voltage of the capacitor bank, the power flows from the motor to the bank. Thus the energy recovered is stored in the battery or the capacitor bank.

Frequent charging and discharging of the battery impact the life of the battery. To avoid these, we add a capacitor bank or ultra-capacitors to the system. Ultra-capacitors or Super Capacitors can discharge and charge for many cycles without any performance degradation, which helps in increasing the life of the battery. Ultra-capacitor has fast response, which helps in capturing the energy peaks/surge effectively during the regenerative braking operation. The reason for choosing an ultra-capacitor is that it can store 20 times more energy than electrolytic capacitors.

In an embodiment, the ultra-capacitor store about 25 times, 30 times, 40 times, 50 times, 60 times, 70 times, 75 times, 100 times more energy than an electrolytic capacitor.

This system houses a DC to DC converter. During acceleration, the boost operation allows the capacitor to discharge up to a threshold value. During deceleration (i.e. braking) the buck operation allows the capacitor to charge. As a result of the buck operation the switch turns on and lets current flow to the output capacitor, charging it up. The ultra-capacitors have a good transient response, which is useful during starting of the vehicle. By storing the recovered energy apart from the battery, it can help in extending the range of the vehicle and can also support sudden acceleration with the help of the boost circuit. Regenerative braking helps in extending the range of the electric vehicle by 8-25%. Apart from saving energy and enhancing the range, it also helps in effective control of the braking operation. In addition to improving the overall efficiency of the vehicle, regeneration can significantly extend the life of the smart energy storage device by maintaining the charge at an optimal level and the life of the overall braking system as the mechanical parts will not wear out very quickly.

Ultra-capacitors are another method to store electrical energy for electric vehicle batteries. Ultra-capacitors have very high-power density and low energy density. A combination of battery and ultra-capacitor can be used in electric vehicles to overcome a few drawbacks and to extend the life of the pure carbon-based graphene smart electric battery. Momentarily available electric energy from regenerative braking can be stored in ultra-capacitors and eventually use to charge the smart electric battery.

In an embodiment, the kinetic energy is converted to thermal energy whenever motion with friction occurs, for example when a viscous fluid is stirred. The coefficient of kinetic friction is assigned the Greek letter "mu" ($\mu$), with a subscript "k". The force of kinetic friction is $\mu k$ times the normal force on an object and is expressed in units of Newtons (N).

force of kinetic friction=(coefficient of kinetic friction)(normal force)

$F_k = \mu k \eta$ $F_k$=force of kinetic friction=

$\mu k$=coefficient of kinetic friction $\eta$=normal force (Greek letter "eta")

In other words, the apparatus is to use an intelligent sensor device that has its own built-in energy storage device.

In an embodiment, smoke or gas concentration can be detected by measuring the resistance change of Metal Oxide Semiconductor (MOS)-type gas sensors.

The chemical reaction of gases and adsorbed oxygen on a given surface would vary depending on the reactivity of sensing materials and working temperature of the sensor. When the combination of sensors is exposed to combustible inorganic gases (carbon monoxide or CO2) and even hydrocarbons, the oxidation reaction of such gas with adsorbed oxygen occurs at the surface of the surface. Many gases when mixed in a certain proportion with an oxidant, normally air, will ignite. So flammable gas detectors are calibrated for the flammable gas hazard in question and must measure in the region from no gas (zero) to the point the gas is just flammable, or 100% lower explosive limit (LEL). Gas detectors are scaled to read from 0 to 100% LEL. For example: 10% LEL and the gas is only 10% of the way to being flammable, 50% LEL and its halfway to being flammable.

An embodiment, highly sensitive aspirating smoke detector, gas sensors a microwave radiometer may be supported by algorithms.

In an embodiment, compared to typical conventional battery material, the highly flexible and electrically conductive pure carbon-based graphene has much higher charging rates, a multi-fold increased capacity, and a quicker cyclability than even graphite, which is widely utilized in li-ion batteries.

In an embodiment, electrode designs using the graphene and white graphene materials will allow the pure carbon-based graphene battery cells to charge much faster and will make rechargeable energy storage devices, just as fast as the speedy supercapacitors that can then be used to store and provide large amounts of energy at a rapid rate. White graphene material resist fire and can stand up to the high temperatures created by fast battery charging. The white graphene material would not only do its usual job of distributing current, but also protect the energy device and it is a fire retardant. Supercapacitors store charge just like a traditional rechargeable energy storage device but can charge incredibly quickly when needed. This carbon-based electrode designs enable rechargeable energy storage devices to last for much longer, charge instantly, hold capacity, discharge slowly, eliminate safety hazards, and provide high-performance long range.

In an embodiment, electrode include graphene and white graphene materials. Which will allow the pure carbon-based graphene battery cells to charge much faster and will make rechargeable energy storage devices, just as fast as the speedy supercapacitors that can then be used to store and provide large amounts of energy at a rapid rate.

In an embodiment, solid state sheets of single layer graphene is used as current electrodes in battery having weigh almost 90% lower and could solve the weight and safety issues due to a fire flare up.

In an embodiment, a solid-state single layer sheet of graphene is used as current electrodes in a battery, weighing almost 90% less as well as solving the weight and safety issues of a fire flare-up and consequent explosion. Thus, providing a higher energy-to-weight ratio. A higher energy-to-weight ratio is key to solving the limited range drawback that electric batteries face today.

In an embodiment, carbon-based graphene and making the electrodes almost 90% lighter would increase the energy density of rechargeable energy storage devices. Saving a battery's weight is highly beneficial as it enables lighter devices and stores more energy per given weight. This can allow both the energy storage devices and the electric vehicles to achieve a longer range between charges by installing lighter and smaller EV batteries with a very large number (hundreds of thousands) of extremely light pure organic polymer based single layer graphene cells. For example, the electrodes in existing Li-ion batteries are dead weight and do not contribute to increasing battery capacity, range, and performance. The current electrodes of Li-ion batteries account for 25% to as much as 50% of the weight of some high-power lighter batteries.

In an embodiment, multi-terminal devices such as integrated circuits (ICs) are to include pure carbon-based single layer graphene sheets as the active material. Yielding a much thinner, more sensitive channel region. The graphene-based ICs will be incorporated into the energy storage management system to maintain optimal temperatures and control settings for dynamic quality performance.

In an embodiment, semiconductors intrinsic electrical properties can be permanently modified by introducing impurities. The property of semiconductors that makes them most useful for constructing nano electronic devices is that their conductivity may easily be manipulated by introducing impurities into their crystal lattice. The process of adding controlled impurities to a semiconductor is known as doping. The amount of impurity, or dopant, added to an intrinsic (pure) semiconductor varies its level of conductivity. Doped semiconductors are often referred to as extrinsic.

In an embodiment, the electrical properties of semiconductors can be dynamically modified by applying electric fields. The ability to control conductivity in small and well-defined regions of semiconductor material, statically through doping and dynamically through the application of electric fields, led to a broad array of semiconductor devices, like transistors. Semiconductor devices with dynamically controlled conductivity are the building blocks of integrated circuits, such as microprocessors.

In an embodiment, IC or chip-manufacturing processes are made of biological and organic carbon-based molecules such as pure organic carbon-based single layer graphene. Integration of organic carbon-based graphene material with inorganic semiconductors, such as silicon carbide (SiC), results in a class of hybrid material which can be highly promising, since they combine the best properties of two counterparts.

In an embodiment, carbon based SiC can be found to have some application as the raw material for integrated circuits, such as microprocessors, that can withstand very high operating temperatures and environments with the presence of significant levels of ionizing radiation. These active semiconductor devices are to be combined with simpler passive components, such as semiconductor capacitors and resistors, to produce a variety of high performing single digit nm that can easily integrate some trillions of transistors on to the IC.

In an embodiment, by introducing defects into the perfect surface of graphene on SiC, it is possible to increase the capacity of the material to store electrical charge. On heating SiC to extreme temperatures such as 3800° F. and above in a vacuum, silicon atoms on the surface moves to the vapor phase and only the carbon atoms remain, which form graphitic layers, also called few-layer graphene (FLG).

An embodiment, an electrochemical process known as 'anodizing' helps breaks down the single layer graphene sheet such that more edges are created. Measuring the properties of anodized graphene allows the capacity of the graphene material to store electric charge increases and becomes quite high. On changing the properties of the combined material in a controlled manner, it may be possible to tailor the surface for other functions, such as sensors, microprocessors, and rechargeable energy storage devices with self-charge.

In an embodiment, with graphene's broad electrochemical potential and its ability to be functionalized, graphene-based integrated circuits demonstrate extremely high processing power in the field of computers and artificial intelligence based high processing computing. Because of graphene's extreme surface-to-volume ratio, even the smallest concentration of attached molecules changes the channel conductivity. Many graphene-enhanced nano sensors that are to be utilized, include microelectromechanical systems (MEMS) sensors, pressure sensors, pH sensors, environmental contamination sensors, gas sensors and more.

In an embodiment, a rechargeable energy storage device and nanoelectronics such as integrated circuit comprise of white graphene material and pure carbon-based organic graphene.

In an embodiment, the apparatus and assessment of the utilization of next-generation energy storage technologies and specifically in rechargeable batteries beyond Lithium-Ion Batteries (LIBs), which include alkali-ion (e.g., Na+, K+) storage, multivalent-ion (e.g., Mg2+, Zn2+, and Al3+) storage, and metal batteries are further described, with emphasis on the relationship between structure and electrochemical performances. This describes a system, apparatus or method that includes a positive electrode or cathode that has a single layered pure carbon-based positive electrode sheet which is the active material that consists of graphene oxide as well as a positive grid that contains a graphene alloy.

In an embodiment, the negative electrode (anode) is active material that contains a single layered pure carbon-based negative electrode sheet which is made of a sponge-like graphene material and a negative grid also consisting of a graphene alloy. Both grids are used to hold the pure carbon-based active material and are designed to work as a current collector, which is an electrical conductor between the electrodes and the external circuits that works as support for the coating of the electrode materials. Cells contain pure organic carbon-based separators that create a barrier between the anode and cathode while allowing for the exchanging of electrons from the anode to the cathode since electrons have a negative charge and attract to positive charges and allow for the movement of ions. Multiple single layered pure carbon-based graphene cell sets are then combined to create a single pure carbon-based graphene cell pack or cell block that form the single battery cell pack of the apparatus.

In an embodiment, removable cells are replaced by new ones when the cell has been used. A catalyst between the anode and cathode reacts with graphene itself, a graphene substrate interaction can help orient a reaction. It is a safe substitute for an electrolyte that will allow for the movement of ions which act as an insulator. This environment-friendly organic pure carbon-based dry cell can be rechargeable and decomposable once it has been sufficiently used or is deemed to be close to the end of its life.

In an embodiment, in the described apparatus or system, the rechargeable energy storage device's interior compartments and cell walls are coated with hBN layers to provide the desirable safety aspects to the apparatus.

In an embodiment, graphene and white graphene have the potential to be used as intelligent nano sensors. The apparatus focuses on the use of functionalized large area covalently modified single layer graphene sheets which are transferable to any surface for use in chemical or biosensing.

Using nanotechnology, the objective is to enable biosensors to detect even the smallest amounts of chemical vapors in the internal components of the carbon-based cell packs. Various types of detecting elements, such as single layered carbon nanotubes, carbon nanowires or carbon nanoparticles can be used in nanotechnology-based nano sensors. Nano sensors that may be types of chemical, mechanical, biological, and optical sensors and biosensors are highly sensitive analytical sensing devices that detect and convert chemical and bioinformation (such as concentration, pressure, activity of particles) into an electrical signal to obtain qualitative or quantitative time- and spatial-resolved information about specific chemical components detected in the pure carbon-based graphene cell packs.

In an embodiment, nano sensors typically are also highly sensitive measurement devices that convert a chemical or physical property of a specific analyte into a measurable signal, whose magnitude is normally proportional to the concentration of the analyte. A nano sensor uses capacitive readout constructs and nano electronics to analyze a transmitted signal. These nano sensors are sensitive enough to detect extremely minute chemical or biological molecules at the atomic, molecular and super molecular scale. Generally, nano sensors are used to detect extremely small amounts of chemical components. Types of detection elements, such as carbon nanotubes, zinc oxide nanowires, or palladium nanoparticles can be used as chemical and biosensors.

In an embodiment, first component of a chemical sensor is a chemical, or molecular recognition. And, the second part, usually a receptor is a physiochemical transducer. Chemical sensors therefore involve two main stages in its functioning namely recognition and transduction. In the recognition stage, the analyte interacts selectively with receptor sites in the recognition element of the sensor. This is reflected in the variation of certain physical parameters, which generate the output signal with the help of a transducer. In the second stage the transducer converts a primary form of energy into a desired corresponding measurable signal.

In an embodiment, graphene based integrated circuits perform in a speedier manner, when with the silicon material in IC is replaced with graphene material.

In an embodiment, present system uses the modified single layer graphene sheets as a nano sensors, and as an optimally performing device will be able to: (a) detect the charge state including the zero state of charge (b) give out a strong electrical signal due to its very sensitive nature (c) produce identical responses within identical situations (d) resist unwanted effects from internal and external disturbances such as temperature changes or degradation of the graphene cells (e) produce a straight line relationship between concentration and output response to a high resolution and over a wide enough range.

In an embodiment, functionalized large area covalently modified white graphene sheets are highly relevant for many applications from biosensors to solar cells to pure organic carbon-based single layered graphene EV cells. The enhanced sensitivity of electrochemical biosensors is to further progress the recent advances in materials science with the use of novel materials such as organic, and inorganic nanoparticles that include white graphene. The nano sensors and analyzers based on white graphene can sense and identify desired results easier and faster than normal sensors. Carbon nanotubes, a straw-like structure made of carbon, is at least 100 times stronger than steel while graphene on the other hand, is at least 200 times stronger than steel.

In an embodiment, GO is usually prepared by the CVD or the Hummer's method.

The CVD process for graphene development is achieved in two stages. Pyrolysis of precursor material is the initial step of this procedure which manages the development of carbon atoms on the surface of the substrate material. The second stage is a heat-involving process which manages the aggregation of separated carbon atoms on the substrate, which forms a solitary layer structure. In this technique, a metal impetus (copper preferred) and a large amount of heat is required to break the carbon-carbon bonds (carbon-carbon single bond=347 kJ mol-1, carbon-carbon double bond=614 kJ mol-1, carbon-carbon triple bond=839 kJ mol-1, carbon-hydrogen bond=413 kJ mol-1). The number of layers and defects in graphene can be controlled using the CVD approach, but the same may be challenging using the Hummer's method.

In an embodiment, white graphene-based sensors with nano sensing capabilities will indicate when a graphene cell has reached the end of its charge life so it can be recharged or replaced. Can sense when the Single Layer Anodized Graphene cells does not have the required threshold of rough edges to hold maximum charge and provide peak performance. This leads us to the point that some of the Single Layer Anodized Graphene cells based on their rough edges may perform better than some other Single Layer Anodized Graphene cells in the cell pack. The measurement known as "absolute zero" describes a state of matter where there is no movement whatsoever inside an object, even at the sub-atomic level. It is the coldest state of matter. As soon as an object is heated, the particles inside it start to move. The white graphene-based nano sensors are to pick up on this movement and measure it, which can be translated into a temperature and detection. All objects give off a heat signature, so a nano sensor is to detect when its temperature has dropped or increased, or any other changes.

In an embodiment, the cathode active material is preferably selected from a metal oxide/phosphate/sulfide, an inorganic material, an organic or polymeric material, or a combination thereof: a) The group of metal oxide, metal phosphate, and metal sulfides consisting of lithium cobalt oxide, lithium nickel oxide, lithium manganese oxide, lithium Vanadium oxide, lithium transition metal oxide, lithium-mixed metal oxide, lithium iron phosphate, lithium manganese phosphate, lithium Vanadium phosphate, lithium mixed metal phosphates, transition metal Sulfides, and combinations thereof (a) In particular, the lithium Vanadium oxide may be selected from the group consisting of VO, LiVO, V2Os, LiV2Os. VOs, LiVOs, LiVO7. V09. LiVO, VO, LiVO, their doped versions, their derivatives, and combinations thereof, wherein $0.1<x<5$; (b) Lithium transition metal oxide may be selected from a layered compound LiMO, spinel compound LiMO, olivine compound LiMPO, silicate compound LiMSiO Tavorite compound LiMPOF, borate compound LiMBO, or a combination thereof, wherein M is a transition metal or a mixture of multiple transition metals. b) An inorganic material selected from: (a) bismuth Selenide or bismuth telluride, (b) transition metal dichalcogenide or trichalcogenide, (c) sulfide, selenide, or telluride of niobium, Zirconium, molybdenum, hafnium, tantalum, tungsten, titanium, cobalt, manganese, iron, nickel, or a transition metal; (d) boron nitride, or (e) sulfur, sulfur compound, lithium polysulfide (f) a combination thereof. In particular, TiS, TaS, MoS NbSe non-lithiated MnO, CoO, iron oxide, Vanadium oxide, or a combination thereof may be used as a cathode active material in a lithium metal cell. c) An organic material or polymeric material selected from Poly(anthraquinonyl sulfide) (PAQS), a lithium oxocarbon, 3.4.9,10-perylenetetracarboxylic dianhydride (PTCDA), poly(anthraquinonyl sulfide), pyrene-4.5,9,10 tetraone (PYT), polymer-bound PYT, Quino(triazene), redox-active organic material, Tetracyanoquinodimethane (TCNQ), tetracyanoethylene (TCNE), 2,3, 6,7,10,11-hexamethoxytriphenylene (HMTP), poly(5-amino-1,4-dyhydroxyanthraquinone) (PADAQ), phosphazene disulfide polymer ((NPS),n), lithiated 1.4.5.8-naphthalenetetraol formaldehyde polymer, Hexaazatrinaphtylene (HATN), Hexaazatriphenylene hexacarbonitrile (HAT(CN)), 5-Benzylidene hydantoin, Isatine lithium salt, Pyromellitic diimide lithium salt, tetrahydroxy-p-benzoquinone derivatives (THQLi.), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5.7. 12, 14-pentacenetetrone (PT), 5-amino-2,3-dihydro-1, 4-dyhydroxyanthraquinone (ADDAQ), 5-amino-1,4-dyhydroxyanthraquinone (ADAQ), calixquinone, LiCO, Li$_2$CO. LiCO, or a combination thereof. The thioether polymer is selected from Polymethane tetryl-tetra(thiomethylene) (PMTTM), Poly(2,4-dithiopentanylene) (PDTP), a polymer containing Poly (ethene-1,1,2,2-tetrathiol) (PETT) as a main-chain thioether polymers, a side-chain thioether polymer having a main-chain consisting of conjugating aromatic moieties, and having a thioether side chain as a pendant, Poly(2-phenyl-1,3-dithiolane) (PPDT), Poly(1,4-di(1, 3-dithiolan-2-yl)benzene) (PDDTB), poly(tetrahydrobenzodithiophene) (PTHBDT), poly 1,2,4,5-tetrakis(propylthio) benzene (PTKPTB, or poly(3,4 (ethylenedithio)thiophene (PEDTT). The organic material may include a phthalocyanine compound selected from copper phthalocyanine, Zinc phthalocyanine, tin phthalocyanine, iron phthalocyanine, lead phthalocyanine, nickel phthalocyanine, Vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof.

In an embodiment, electric-vehicles headlights, with the white graphene-based laser diodes are to become smaller and brighter and use less energy. These laser diodes compliment the graphene and white graphene-based rechargeable energy storage devices very well as they use the same efficient material do to more work with less energy usage and storage.

In an embodiment, rechargeable energy storage devices such as EV batteries using graphene and white graphene are to be much lighter, slimmer, and extremely flexible than conventional li-ion cells. Smaller, thinner energy storage devices with larger capacities that do not require extra room and provide longer lasting charge are far more efficient and safer than conventional cells. Li-ion stores up to 180 Wh of energy per kilogram while graphene can store up to 1,000 Wh, 2000 Wh/kg, 2500 Wh/kg, 5000 Wh/kg, 10000 Wh/kg or more on a single charge depending on the size of the EV battery and the consequent number of cells pack housed in the EV battery casing. EV Batteries using single layer anodized graphene cell's rate of charge is exponentially much higher, and it is much more efficient than other conventional materials.

In an embodiment, fast device-to-device charging by the graphene and white graphene-based batteries are seen to be very useful for electric vehicle batteries. High heat conductance also means that batteries run cooler, prolonging their lifespan even in cramped cases like a smartphone. White graphene being a strong dielectric material transparent to both electromagnetic waves and radio frequencies, has one of the greatest thermal conductivities of electrical insulators partially due to its wide bandgap. Its hexagonal form corresponding to graphene is the most stable and soft among the BN polymorphs and its thermal and chemical stability is far more improved.

In an embodiment, the white graphene's band gap can be modified and become significantly tuned by lattice straining or distortion to allow for more efficient and reliable power. This would create a high defect tolerance and elasticity which will prevent conductors and semiconductors from causing electrical incidents and dangerous situations such as fires which the Li-ion batteries were prone to causing due to its inefficiency.

Example

Preparation of Graphene Oxide (GO) for anode using CVD or Hummer's method: GO was prepared according to the modified Hummer method. In detail, 5 g of graphite and 2.5 g of $NaNO_3$ were mixed with 108 mL $H_2SO_4$ and 12 mL H3PO4 and stirred in an ice bath for 10 min. Next, 15 g of $KMnO_4$ were slowly added so that the temperature of the mixture remained below 5° C. The suspension was then reacted for 2 h in an ice bath and stirred for 60 min before again being stirred in a 40° C. water bath for 60 min. The temperature of the mixture was adjusted to a constant 98° C. for 60 min while water was added continuously. Deionized water was further added so that the volume of the suspension was 400 mL. 15 mL of $H_2O_2$ was added after 5 min. The reaction product was centrifuged and washed with deionized water and 5% HCl solution repeatedly. Finally, the product was dried at 60° C.

The preparation of Graphene modified cathode active material: Typically, 6.0 g of $KNO_3$ and 5.0 g of natural graphite (300 mesh) were added to 230 ml of concentrated $H_2SO_4$ (98%) at room temperature. The mixture was stirred for 10 min before slow addition of 30 g of $KMnO_4$. Then, the mixture was heated to 35° C. and stirred for 6 h. Subsequently, 80 ml of water was added dropwise under vigorous stirring, causing a quick rise in temperature to ~90° C. The slurry was stirred at this temperature for another 30 min. Afterwards, 200 ml of water and 6 ml of $H_2O_2$ solution (30 wt %) were added sequentially to dissolve insoluble manganese species. The resulting graphite oxide suspension was washed repeatedly in water until the solution pH reached a constant value of ~5.0. The complete delamination of graphite oxide into GO was achieved by ultrasonic treatment. The final suspension of GO was concentrated to a content of 1-2 wt %.

For the preparation of graphene-enhanced particulates, an amount of a selected electrode active material powder was added to a desired amount of GO Suspension to form a precursor mixture. The ration of cathode active material: GO is 10:1 (wt.). DI water was added to the mixture to adjust the solid content to 10 wt %. Thereafter, the slurry was stirred, and ultrasonically exposed for 5 min, and then spray dried at 200° C. to form a solid cathode active material/GO composite. The composites were heated to 600° C. at a rate of 5° C. min-1 and annealed at that temperature for 5 h under Ar to form the active material/graphene cathode materials.

Preparation of Polymer/Li/GO solid electrolyte film: Solid polymer electrolyte films were prepared by solution casting method. The electrolyte solution was prepared by mixing of Polyethylene oxide (PEO) and Lithium perchlorate salt ($LiClO_4$) in ration (PEO/Li) of 16:1 in a 4 oz. jar half filled with the solvent acetonitrile ($C_2H_3N$) for which 1 wt % of GO content was added to make a solution. After sonication for 30 min in Branson 3510 Sonicator, the resulting viscous solution was then casted on a Teflon petri dish (area=76.9 cm2) and vacuum dried at 50° C. for ~24 h, to obtain free standing solid electrolyte films with a thickness of ~200 μm.

REFERENCES

All references, including granted patents and patent application publications, referred herein are incorporated herein by reference in their entirety.
U.S. Pat. No. 9,305,716B2
US20180086224
U.S. Pat. No. 8,378,623B2
U.S. Pat. No. 9,203,084B2
U.S. Pat. No. 9,203,084B2
J. Nanomater, Volume 2014, Article ID 276143, 6.
J. Mater. Chem., 2011, 21, 3353-3358.
Nanoscale, 2015, 7, 17516-17522

The invention claimed is:

1. A energy storage device comprising a cell, wherein the cell comprises:
A) at least two sheets of single layered graphene to form two electrodes consisting of a cathode and an anode;
B) a separator sandwiched between the anode and the cathode, wherein the separator comprises a graphene ceramic composite material, wherein the graphene ceramic composite material is configured to filter electrons passing between the anode and the cathode;
wherein the cathode comprises graphene oxide and a first graphene alloy and the anode comprises a second graphene alloy;
C) an electrolyte comprising a material comprising a third graphene material different from the first graphene alloy and the second graphene alloy, wherein the electrolyte is in a solid state; and
D) a carbon-based catalyst configured to react with the third graphene material to start a reaction
wherein an inner compartment of the cell is coated with white graphene.

2. The energy storage device of claim 1, wherein the energy storage device is capable of self-recharging.

3. The energy storage device of claim 1, wherein the cell comprises a thermal protector component.

4. The energy storage device of claim 3, wherein the thermal protector component is a graphene reinforced hybrid organic polymer.

5. The energy storage device of claim 4, wherein the cell further comprises a sensor configured to maintain an internal heating of the cell and regulate switching on-off to charge the cell autonomously.

6. The energy storage device of claim 5, wherein the sensor comprises fourth graphene material.

7. The energy storage device of claim 4, wherein the energy storage device is capable of recharging at least about 10,000 charge cycles.

8. The energy storage device of claim 1, wherein the cell has an energy density of about 1000 Wh/kg or more.

9. The energy storage device of claim 1, an upper face of said sheets interact with sodium ions.

10. The energy storage device of claim 1, wherein the separator further comprises a fifth graphene alloy.

11. The energy storage device of claim 1, wherein the energy storage device is configured to be used as a battery in an electric vehicle.

12. The energy storage of device of claim 11, wherein the battery comprises a thermal protection layer configured to transfer heat from the battery towards a driver's cabin.

13. The energy storage of device of claim 11, wherein the battery further comprises a self-charge feature.

14. The energy storage device of claim 11, wherein the battery comprises the cell in a nano dimension, wherein cells are interconnected to each other.

15. The energy storage device of claim 1, further comprises a safety casing comprising an organic polymer.

16. The energy storage device of claim 1, wherein the cell is configured to be capable of self-healing.

17. The energy storage device of claim 1, wherein the organic separator comprises a compression pad.

18. The energy storage device of claim 17, wherein the compression pad comprises a sixth graphene alloy.

19. The energy storage device of claim 1, wherein each single layered graphene has Young's module about 1 terapascals TPa.

* * * * *